US008601389B2

(12) United States Patent
Schulz et al.

(10) Patent No.: US 8,601,389 B2
(45) Date of Patent: Dec. 3, 2013

(54) SCROLLABLE MENUS AND TOOLBARS

(75) Inventors: Egan Schulz, San Jose, CA (US); Tom Langmacher, Washougal, WA (US)

(73) Assignee: Apple Inc., Cupertino, CA (US)

( * ) Notice: Subject to any disclaimer, the term of this patent is extended or adjusted under 35 U.S.C. 154(b) by 298 days.

(21) Appl. No.: 12/433,891

(22) Filed: Apr. 30, 2009

(65) Prior Publication Data

US 2010/0281374 A1    Nov. 4, 2010

(51) Int. Cl.
*G06F 3/14* (2006.01)
(52) U.S. Cl.
USPC ........... 715/786; 715/202; 715/718; 715/783; 715/810; 715/834; 715/835; 715/841; 345/156; 345/173; 345/719; 345/760; 345/800; 345/810; 348/47; 705/14
(58) Field of Classification Search
USPC .......... 715/200–277, 700–867; 700/701–866; 709/201–229; 705/50–79, 14; 345/30–111, 810, 173; 348/47
See application file for complete search history.

(56) References Cited

U.S. PATENT DOCUMENTS

| | | | |
|---|---|---|---|
| 5,598,183 A | | 1/1997 | Robertson et al. |
| 5,745,715 A | | 4/1998 | Pickover et al. |
| 5,805,167 A | | 9/1998 | van Cruyningen |
| 5,828,360 A | | 10/1998 | Anderson et al. |
| 5,883,625 A | | 3/1999 | Crawford et al. |
| 6,028,600 A | * | 2/2000 | Rosin et al. ................. 715/718 |
| 6,031,529 A | * | 2/2000 | Migos et al. ................. 715/783 |
| 6,208,342 B1 | | 3/2001 | Mugura et al. |
| 6,448,987 B1 | | 9/2002 | Easty et al. |
| 6,538,635 B1 | * | 3/2003 | Ringot ........................ 345/156 |
| 6,883,143 B2 | | 4/2005 | Driskell |
| 7,350,158 B2 | * | 3/2008 | Yamaguchi et al. .......... 715/834 |
| 7,516,419 B2 | * | 4/2009 | Petro et al. .................. 715/834 |
| 7,634,740 B2 | * | 12/2009 | Enomoto et al. ............. 715/810 |
| 7,644,372 B2 | | 1/2010 | Russo |

(Continued)

FOREIGN PATENT DOCUMENTS

| | | |
|---|---|---|
| AU | 2010241880 | 4/2010 |
| CN | 1471309 A | 1/2004 |

(Continued)

OTHER PUBLICATIONS

Nicholls, Stu, "A circular Menu with submenus", 2008 stu nicholls—cssplay.co.uk, Nov. 10, 2008, http://www.cssplay.co.uk/menus/circular-sub.html.

(Continued)

*Primary Examiner* — Ruay Ho
(74) *Attorney, Agent, or Firm* — Schwegman Lundberg & Woessner, P.A.

(57) ABSTRACT

Some embodiments of the invention provide a method that defines several menu items having a particular order. The method provides a display area for displaying a portion of the menu items in the particular order. The method provides a selection window in the display area for indicating that a menu item is presently selectable. The display area is also for receiving input to (i) scroll the menu items through the selection window in the particular order and (ii) select a particular menu item when the particular menu item is displayed in the selection window. In some embodiments, the display area is a linear display area, while in some embodiments it is a semi-circular display area or other shape.

29 Claims, 23 Drawing Sheets

(56) References Cited

U.S. PATENT DOCUMENTS

| | | | |
|---|---|---|---|
| 7,661,075 B2* | 2/2010 | Lahdesmaki | 715/841 |
| 7,676,763 B2 | 3/2010 | Rummel | |
| 7,730,425 B2* | 6/2010 | de los Reyes et al. | 715/835 |
| 7,791,666 B2 | 9/2010 | Suzuki | |
| 2002/0063738 A1* | 5/2002 | Chung | 345/810 |
| 2004/0117257 A1* | 6/2004 | Haberman et al. | 705/14 |
| 2004/0155907 A1 | 8/2004 | Yamaguchi et al. | |
| 2004/0221243 A1 | 11/2004 | Twerdahl et al. | |
| 2005/0012723 A1* | 1/2005 | Pallakoff | 345/173 |
| 2005/0044509 A1 | 2/2005 | Hunleth et al. | |
| 2005/0223339 A1 | 10/2005 | Lee | |
| 2005/0278647 A1 | 12/2005 | Leavitt et al. | |
| 2006/0248475 A1* | 11/2006 | Abrahamsson | 715/835 |
| 2007/0008300 A1 | 1/2007 | Yang et al. | |
| 2007/0180392 A1 | 8/2007 | Russo | |
| 2007/0234223 A1 | 10/2007 | Leavitt et al. | |
| 2007/0250793 A1 | 10/2007 | Miura et al. | |
| 2008/0222569 A1 | 9/2008 | Champion et al. | |
| 2008/0252597 A1 | 10/2008 | Heynen et al. | |
| 2009/0172596 A1* | 7/2009 | Yamashita | 715/834 |
| 2009/0237492 A1* | 9/2009 | Kikinis et al. | 348/47 |
| 2009/0313534 A1* | 12/2009 | Davis et al. | 715/202 |
| 2010/0192103 A1 | 7/2010 | Cragun et al. | |

FOREIGN PATENT DOCUMENTS

| | | |
|---|---|---|
| CN | 102449589 A | 5/2012 |
| EP | 2425320 | 3/2012 |
| IN | 7491/CHENP/2011 | 10/2011 |
| WO | WO 2009/062763 | 5/2009 |
| WO | WO 2010/126782 | 11/2010 |

OTHER PUBLICATIONS

"Mobile/UI/Designs/Touchscreen/PROPOSAL5", MozillaWiki, NPL Date Unknown, https://wiki.mozilla.org/Mobile/UI/Designs/TouchScreen/Proposal5.

International Search Report and Written Opinion for PCT/US2010/032138, Aug. 19, 2010 (mailing date), Apple Inc.

Portions of prosecution history of EP 10716210, Jun. 13, 2012 (filing date), Apple Inc.

Prosecution history of 7491/CHENP/2011, Nov. 23, 2011, Apple Inc.

International Preliminary Report on Patentability and Written Opinion of PCT/US2010/032138, Nov. 1, 2011 (issuance date), Apple Inc.

Updated portions of prosecution history of 7491/CHENP/2011, Apr. 12, 2012, Apple Inc.

"Australian Application Serial No. 2010241880, Office Action mailed Jan. 8, 2013", 4 pgs.

"Australian Application Serial No. 2010241880, Office Action mailed Dec. 6, 2012", 3 pgs.

"Australian Application Serial No. 2010241880, Response filed Apr. 22, 2013 to Subsequent Examiner Report mailed Jan. 8, 2013", 19 pgs.

"Chinese Application Serial No. 201080023469.7, Office Action mailed Apr. 19, 2013", 14 pgs.

"International Application Serial No. PCT/US2010/032138, International Preliminary Report on Patentability mailed Nov. 1, 2011", 5 pgs.

"Korean Application Serial No. 10-2011-7028492, Notice of Preliminary Rejection mailed Jun. 24, 2013".

* cited by examiner

SCROLLABLE MENUS AND TOOLBARS

FIELD OF THE INVENTION

The invention is directed towards the presentation of menu or toolbar options in a graphical user interface. Specifically, the invention is directed towards presenting numerous options that scroll through a particular location at which the options can be selected.

BACKGROUND OF THE INVENTION

User interfaces of computer applications often provide numerous commands or user interface tools for a user to choose from. For instance, many applications include drop-down menus. Such menus often include lists of commands. There are standard commands such as opening a file, printing a document, saving a document, etc., as well as more application-specific commands such as inserting a page break (for a word-processing application), formatting cells (for a spreadsheet application), etc.

Many applications also include toolbars or tool palettes. For instance, many computing applications have one or more rows of toolbars at the top of their user interface. The toolbars include various types of tools. Drawing applications have drawing tools, video editing applications have video-editing tools, etc. Some applications also have floating tool palettes. For instance, some video-editing applications include a floating trim tool palette that allows a user to select between various different trim tools for video-editing.

Such toolbars, tool palettes and drop-down menus can take up valuable real estate in the graphical user interface. Furthermore, the number of items in such menus and toolbars is limited by screen space. For example, a user does not want a floating tool palette that takes up too much of the screen. As more options are added to a tool palette, the tool palette must get larger or the size of the options must get smaller. Just as the tool palettes can only increase in size to a certain point, the size of the options can only decrease to a certain point before they become indistinguishable. As such, a need exists for ways to display toolbars or menus that do not take up significant amounts of screen space while keeping the options at a visually recognizable size.

SUMMARY OF THE INVENTION

Some embodiments of the invention provide a novel method for presenting a menu in a graphical user interface. The menu includes several selectable menu items that are assigned a particular order for scrolling through a selection window based on user input. In some embodiments, each of the menu items is associated with a command. When a menu item is in the selection window, a user can select the menu item in order to perform the command associated with the menu item.

The menu items may be displayed as standard text items in some embodiments (e.g., "File", "Save", "Print", etc.) or may be displayed as icons (e.g., icons representing various tools, such as drawing tools, video editing tools, etc.). The menu items are ordered within the menu (e.g., a first menu item is assigned to be one menu item left of a second menu item). Different embodiments use different techniques to determine this order. For instance, in some embodiments, the order can be defined by a user, by a random process, and/or by a developer of the program or operating system that uses the menu. In some embodiments, the order can also change based on use statistics, favoring menu items that are more regularly selected.

The selection window is an indicator (e.g., a highlight, box, etc.) that indicates that a particular menu item can be presently selected. In some embodiments, the selection window is static or nearly static as the menu items scroll through. In the menu, the order of the menu items is the order in which they scroll through the selection window in response to user input. However, when the menu is initially presented, the menu item that is initially displayed in the selection window need not be the first menu item in the order (i.e., the leftmost, topmost, etc.). As the menu items can scroll in two directions (e.g., left and right, up and down), some embodiments initially display the menu item in the middle of the order in the selection window.

The nature of the scrolling can be in two different forms in some embodiments, depending on how the items are ordered. In some cases, the menu items cannot scroll past the first and last items in the order. In other cases, however, the items can be continuously scrolled in a loop as the ordering of the menu items is only defined relative to one another, and there is only a first item to the extent that there is an item that is initially displayed in the selection window.

In either of these cases, some embodiments scroll the menu items through the selection window in such a fashion that the number of menu items is not limited by space in the graphical user interface. For instance, some embodiments only display the menu item that is presently in the selection window and a portion of the menu items on either side of the selection window. Some embodiments display a small number of menu items on either side of the selection window, with the items that are not actually in the selection window displayed as partially faded. As the menu items scroll through the selection window, new items appear in the display as previously displayed items disappear.

The shape of the displayed menu is also different in different embodiments. Some embodiments display the menu in linear form, with the menu items scrolling in one dimension (e.g., horizontally or vertically). Other embodiments display the menu as a semi-circle, with the menu items scrolling along the semicircle. Other non-linear configurations of menu items are also possible.

The menu also might be presented differently in different embodiments in that some embodiments display the menu constantly at a set location, whereas other embodiments require user input to invoke the display of the menu. For example, the menu might be a toolbar in a media-editing application that occupies a particular location in the user interface of the application, or a menu in an operating system that is invoked by a keystroke.

Different embodiments provide different schemes for navigating through the menu items. In some embodiments, users can click over the displayed items on either side of the selection window in order to cause the next item in the menu order to move into the selection window. Alternatively or conjunctively, in some embodiments, users can scroll the menu items by using various forms of sliding or swiping input (e.g., dragging a mouse). In some cases, the menu items are displayed as moving in large, discernible steps, while in other cases the items are displayed as moving in small steps that make the movement appear smooth.

When a selectable menu item is aligned in the selection window, a user can select the menu item in order to cause instructions associated with the selected menu item to be performed. In some embodiments, the instructions can activate a particular tool (e.g., if the menu is a group of video-editing tools), can cause a command (e.g., save a file, print a document, etc.) to be performed, or can open a submenu. Submenus are opened perpendicular to the previous menu in some embodiments. For instance, when the menu items in an initial menu scroll horizontally through the selection window, some embodiments open a submenu such that the menu items in the submenu scroll vertically through the selection window.

Different embodiments enable users to select a menu item that is in the selection window in different ways. In some embodiments, a user clicks or double-clicks over the menu item in the selection window. In other embodiments, the user selects an item by simply releasing a mouse button while the menu item is scrolling through the selection window. For menu items that open submenus, some embodiments automatically open the submenu when the menu item enters the selection window.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. For instance, some portions of the application refer to examples that receive input from a mouse. One of ordinary skill will recognize that similar input could be received from other cursor controllers or even touch-screens without cursors as well.

Some embodiments of the invention provide a novel method for presenting a menu in a graphical user interface. The menu includes several selectable menu items that are assigned a particular order for scrolling through a selection window based on user input. In some embodiments, each of the menu items is associated with a command. When a menu item is in the selection window, a user can select the menu item in order to perform the command associated with the menu item.

Figure 1:
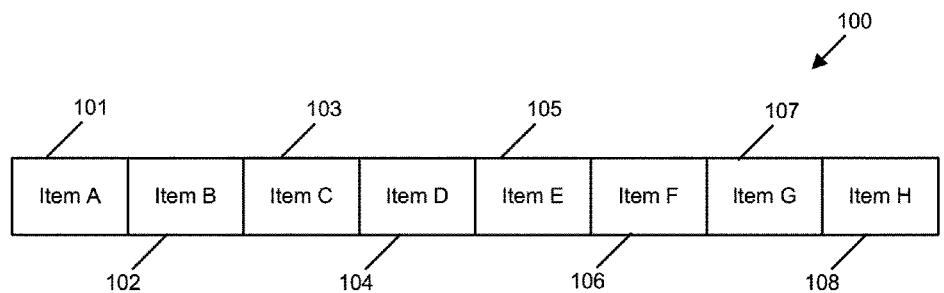
FIG. 1 illustrates a menu including eight menu items.

The menu items may be displayed as standard text items in some embodiments (e.g., "File", "Save", "Print", etc.) or may be displayed as icons (e.g., icons representing various tools, such as drawing tools, video editing tools, etc.). FIG. 1 illustrates a menu 100 that includes eight menu items 101-108. The menu items 101-108 are ordered from the first Item A (101) to the last Item H (108). This means that, for example, Item C (103) will appear in the menu after (e.g, to the right of) Item B (102) and before (e.g., to the left of) Item D (104). Different embodiments use different techniques to determine this order. For instance, in some embodiments, the order can be defined by a user, by a random process, and/or by a developer of the program or operating system that uses the menu. In some embodiments, the order can also change based on use statistics, favoring menu items that are more regularly selected. For example, if Item C (103) is never selected, it might be moved after Item H (108) in the order.

Figure 2:
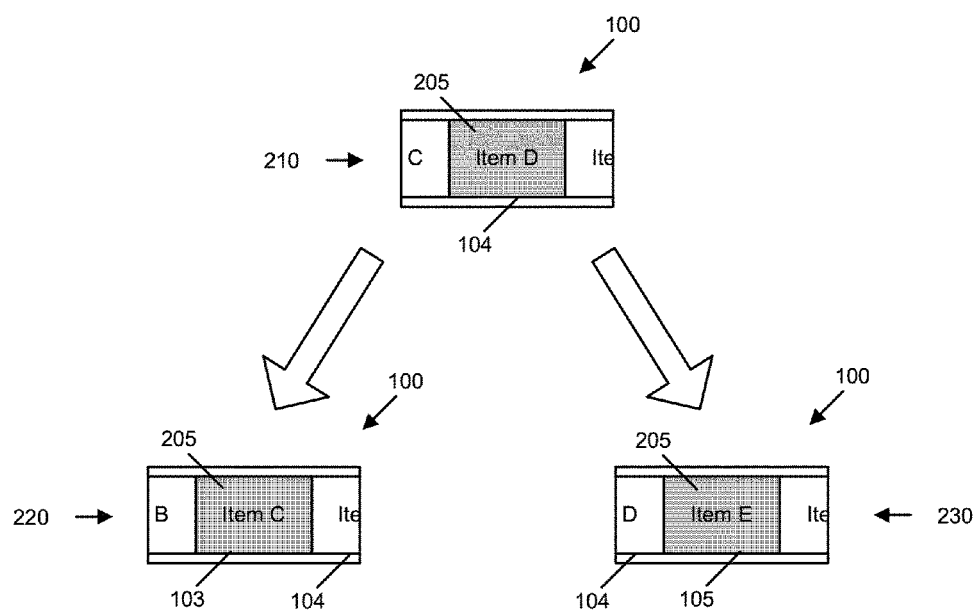
FIG. 2 illustrates the display and use of the menu of FIG. 1 according to some embodiments of the invention.

FIG. 2 illustrates the display and use of menu 100 according to some embodiments of the invention. FIG. 2 illustrates the menu 100 at an initial stage 210 with an initial item in a selection window and two possible second stages 220 and 230 with different items in the selection window. As shown at stage 210, the display of menu 100 includes a selection window 205. The selection window is an indicator (e.g., a highlight in this example) that indicates that a particular menu item can be presently selected. When the menu is initially presented, the menu item that is initially displayed in the selection window need not be the first menu item in the order. In fact, as illustrated at stage 210, the initial menu item displayed in selection window 205 for menu 100 is the fourth menu item 104, which is close to the middle of the order for menu 100.

Stages 220 and 230 illustrate the scrolling of menu 100 through selection window 205 in two possible directions. Stage 220 illustrates the result of user input to scroll through the menu 100 to the right, thereby bringing Item C (103) into selection window 205 from the left and moving Item D (104) mostly out of the display to the right. Similarly, stage 230 illustrates the result of user input to scroll through the menu 100 to the left, thereby bringing Item E (105) into selection window 205 from the right and moving Item D (104) mostly out of the display to the left. One of ordinary skill in the art will recognize that although the example menu 100 scrolls right and left, some embodiments will have a primary scrolling direction of up and down, will scroll diagonally, etc.

Figure 3:
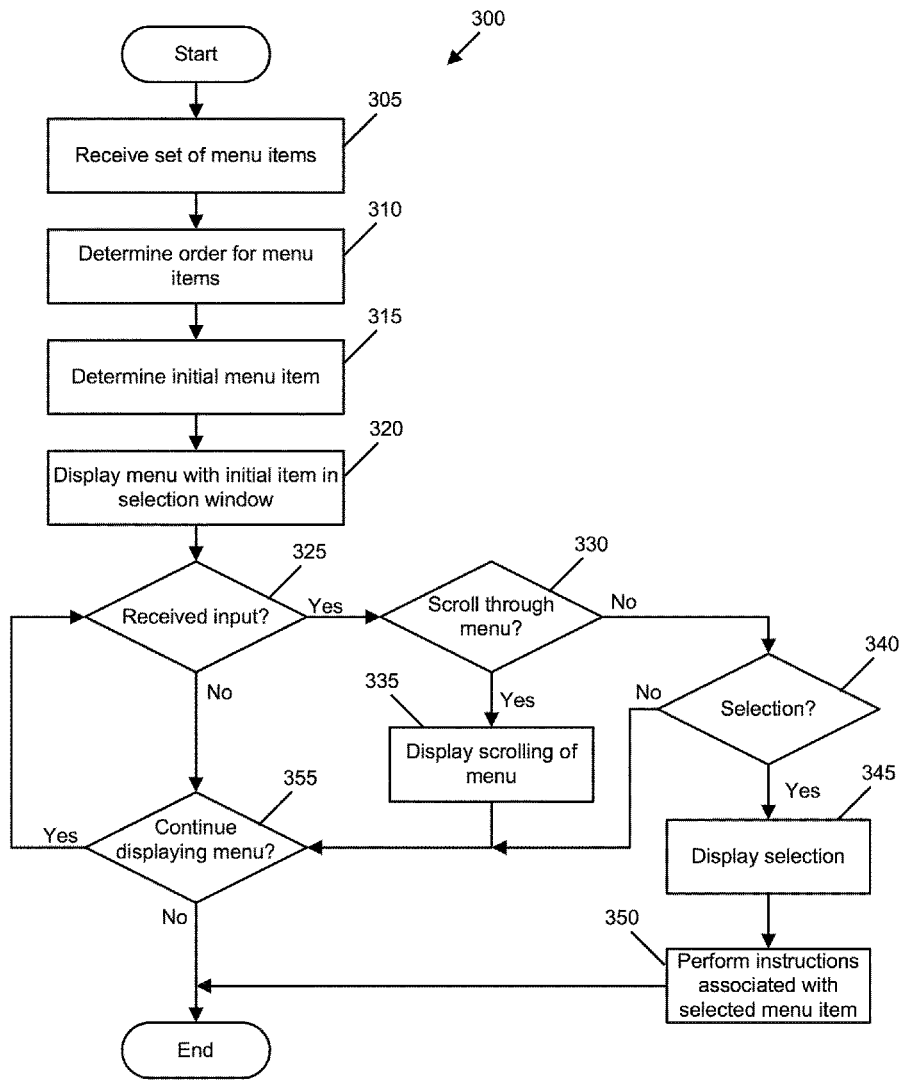
FIG. 3 conceptually illustrates a process of some embodiments for displaying a menu and receiving user interactions with the menu.

FIG. 3 conceptually illustrates a process 300 of some embodiments for displaying a menu and receiving user interaction with the menu. As shown, process 300 begins by receiving (at 305) a set of menu items that make up a menu, such as the menu items 101-108. The set of menu items can include any number of items, because the menu is displayed in such a way that the number of items is not limited by space in the graphical user interface.

Process 300 then determines (at 310) an order for the menu items. As described above, the order can be coded by a software designer, user-determined, determined by use statistics, etc. The process next determines (at 315) an initial menu item that is to be displayed in a selection window. Much like the order of the menu items, some embodiments determine the initial menu item based on coded instructions, user input, use statistics, etc.

The process then displays (at 320) the menu with the initial item in the selection window. Displaying the menu does not necessarily involve displaying all of the menu items; as illustrated in FIG. 2, some embodiments only display one full menu item at a time, which enables the menu to include an unlimited number of items as adding more menu items does not cause the menu to take up any more space. Some embodiments display a small number of menu items on either side of the selection window, with those items that are not in the selection window displayed as partially faded. For instance, at stage 210 of FIG. 2, such embodiments might display Item B (102) and Item C (103) to the left of selection window 205 (and items to the right as well), but display these items as partially transparent to indicate that they are not in the selection window.

Next, process 300 determines (at 325) whether any input has been received. Input can be received through a cursor controller such as a mouse, trackpad, touchpad, etc. (e.g., dragging, scrubbing, clicking, etc.) or through a keyboard (e.g., pressing arrow keys, the Enter key, etc.). When no input is received, the process proceeds to 355, which is described below. Otherwise, the process determines (at 330) whether the input is for scrolling through the menu. Different types of input for scrolling through the menu, such as dragging with a cursor control device, are described in further detail in the following sections.

When the input is for scrolling through the menu, the process displays (at 335) the scrolling of the menu, then proceeds to 355, which is described below. In some embodiments, the selection window does not move as the menu items scroll through. Some embodiments scroll the menu items through the selection window at a constant rate, while other embodiments jump the menu items in large distinguishably discrete steps into the selection window. Furthermore, in some embodiments, the menu items scroll at a constant rate but the selection window moves within a threshold distance of its initial position, jumping from one item to the next. The different menu scrolling displays are described in further detail in the following sections.

The nature of the scrolling at the boundaries of the menu order can be in one of two different forms in some embodiments. In some cases, the order has a defined first and last item, and the items cannot scroll past these endpoint items. For instance, if menu 100 is arranged in this fashion, then when a user scrolls the menu such that Item A (101) is in the selection window 205, there will be no item partially displayed to the left of Item A (101). On the other hand, in some embodiments, the ordering of the menu items is only relative. In such cases, the items are ordered in a loop without a beginning or end and thus the items can be continously scrolled through in a loop. If menu 100 is arranged in this fashion, then when a user scrolls the menu such that Item A (101) is in the selection window 205, Item H (108) would be partially displayed to the left, and scrolling the menu to the right would bring Item H (108) into the selection window 205.

When the received input is not for scrolling through the menu, process 300 determines (at 340) whether the input is for selecting a menu item. Input to select a menu item can be in the form of a click, a double click, a release of a cursor controller button, etc. When the received input is for selecting a menu item, the process displays (at 345) the selection. For example, some embodiments fade out all menu items except the selected item, or display the menu item blinking.

The process then performs (at 350) instructions associated with the selected menu item, and ends. The menu items can cause all different sorts of instructions to be performed. The menu items could represent different video-editing tools (or any other sort of user interface tool), such as blade, ripple, and slip tools. The menu could also be lists of commands (e.g., save a file, print a document, etc) and submenus. In some embodiments, submenus are opened perpendicular to the previous menu. For instance, if Item C (103) of menu 100 causes a submenu to open, then if at stage 220 a user selects this item, the submenu would open vertically with items above and/or below selection window 205.

When, at 340, the received input is not for selecting a menu item, the process determines (at 355) whether to continue displaying the menu. Some embodiments stop displaying a menu if no input is received for a threshold amount of time, or if the application of which the menu is a part is closed. Some embodiments include an option for a user to select that closes a menu. When process 300 determines to continue displaying the menu, the process proceeds to 325 to continue determining whether input is received. Otherwise, the process ends.

Process 300 is applicable to a variety of embodiments that display menus having different shapes. Some embodiments, as is the case with menu 100, display the menu in linear form, with the menu items scrolling in one dimension. FIG. 2 illustrates menu 100 scrolling horizontally, though the menu items could just as easily be aligned vertically. Other embodiments, rather than displaying the menu in a linear fashion in one dimension, instead display the menu as a semi-circle, with the menu items scrolling along the semicircle. Other configurations of menu items are also possible, such as displaying all of the menu items at once in a circle.

Several more detailed embodiments of the invention are described in the sections below. Section I describes and illustrates various features of linear menus, Section II describes and illustrates various features of semi-circular menus, and Section III presents examples of an alternative circular menu, although many of the features described in these sections are not limited to menus having the particular shape used in the examples. Next, Section IV describes the software architecture of an application that employs the menus of some embodiments. Section V describes a computer system that implements some embodiments of the invention.

I. Linearly-Displayed Menus

As described above, some embodiments of the invention provide menus that are displayed in linear fashion. Each of the following five subsections describe examples of such menus, in which menu items scroll through a selection window. Each of the first four subsections presents a different way for the menu items to scroll through the selection window, while the fifth subsection presents other menu features. One of ordinary skill in the art will recognize that many of the features described in these sections (e.g., how the menu items scroll through the selection window, how submenus are displayed, etc.) are applicable to menus that are not displayed linearly (e.g., semi-circular menus).

The menus in the following subsections are all shown as moving primarily left and right. One of ordinary skill in the art will recognize that similar menus could be implemented that move up and down. Furthermore, some embodiments initially display only a single menu item and can be displayed either vertically or horizontally when activated. Upon activation, the application displaying the menu waits for cursor controller input—if the input is predominantly up or down, then the menu is displayed vertically, while if the input is predominantly left or right, then the menu is displayed horizontally.

A. Scrolling Based on Clicks

Figure 4:
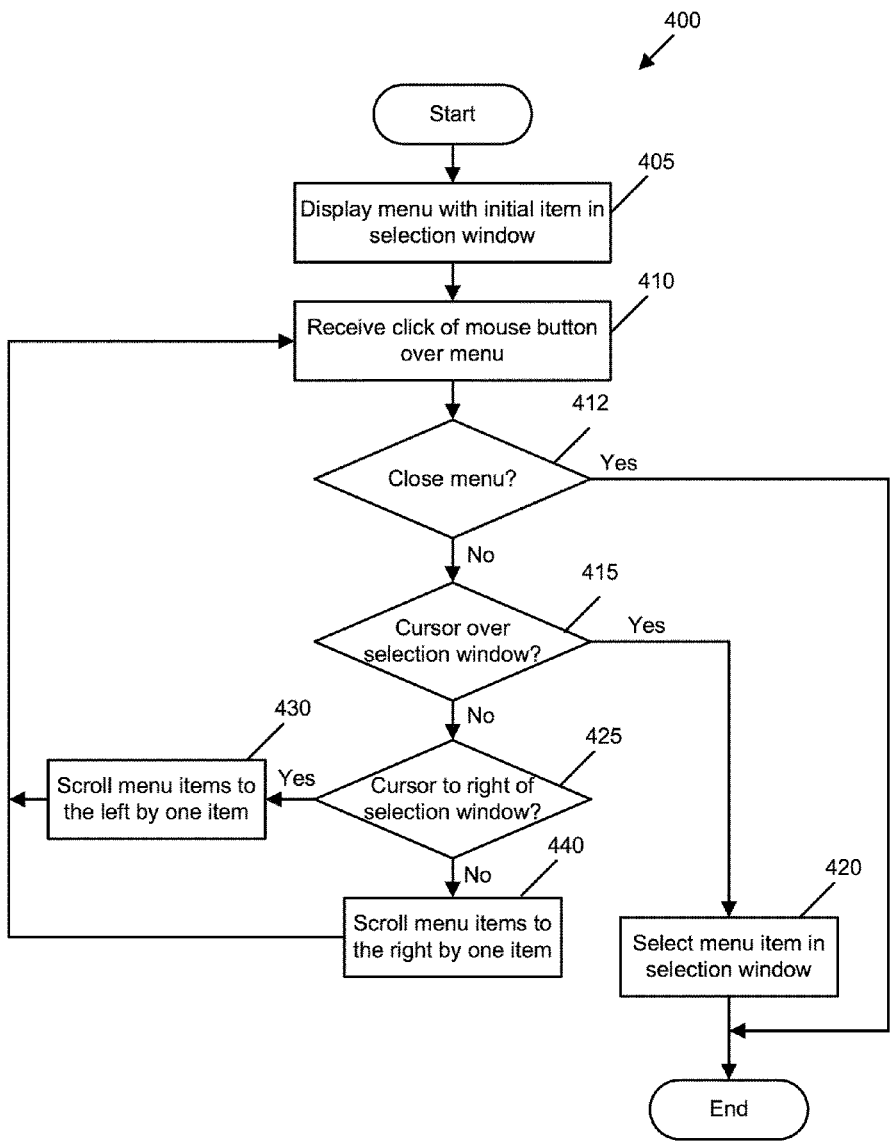
FIG. 4 conceptually illustrates a process of some embodiments for navigating a menu based on single-click input from a cursor controller.
Figure 5:
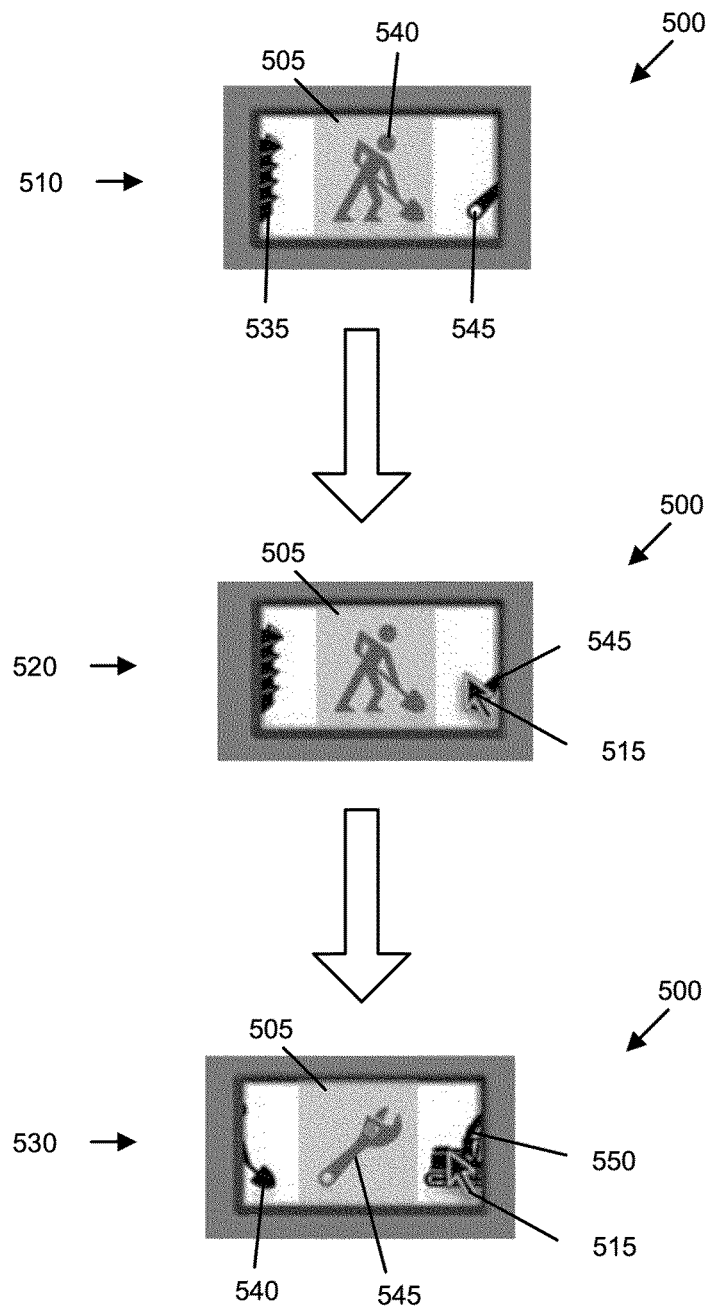
FIG. 5 illustrates the navigation of a menu according to the process of FIG. 4.

FIG. 4 conceptually illustrates a process 400 of some embodiments for navigating a menu based on single-click input from a cursor controller. Process 400 will be described by reference to FIG. 5, which illustrates the navigation of such a menu 500 of some embodiments. FIG. 5 illustrates three stages, 510, 520, and 530. Stage 510 illustrates the menu 500 as initially displayed, stage 520 illustrates the menu 500 and a cursor 515 before click input is received to navigate the menu, and stage 530 illustrates the menu 500 after the click input is received.

As shown, process 400 begins by displaying (at 405) a menu with an initial item in a selection window of the menu. The menu, in some embodiments, includes a number of menu items that have a particular order. Some embodiments order the menu items from a first item to a last item, whereas other embodiments only order the menu items relative to each other. In the latter case, the menu items can be navigated in an infinite loop.

As in FIG. 5, some embodiments display only the selection window, an item in the selection window, and portions of the menu items to either side of the selection window. Stage 510 illustrates selection window 505 with item 540. Item 540 is the item initially displayed in selection window 505. At stage 510, item 535 is partially displayed to the left of item 540 and item 545 is partially displayed to the right of item 540. Item 535 is one item prior to item 540 in the order for the menu items and item 545 is one item after item 540.

Process 400 next receives (at 410) a click of a mouse button (i.e., a press and release of the mouse button). The click could be from a left mouse button (when the process is performed on a system recognizing input from two or more mouse buttons) or from a button that is the only button on the mouse (when the process is performed on a one-button system). One of ordinary skill in the art will understand that similar processes may receive similar input from other types of input devices, as described below. The process then determines the location of the cursor at the time of the click and translates the location and click into an action.

The process determines (at 412) whether the mouse click indicates that the menu should be closed without selecting an item. When the mouse click so indicates, the process ends. For instance, some embodiments include an "x" or similar graphical indication for closing the menu. When a user clicks on the "x", rather than selecting an item or scrolling the menu in either direction, the menu closes. Some embodiments do not include such an option, and the process for navigating such a menu would differ accordingly. For example, in some embodiments the menu is a permanent toolbar in an application, and does not close until the application closes.

When the mouse click does not indicate that the menu should be closed, the process determines (at 415) whether the cursor is over the selection window. When the cursor is over the selection window, the process selects (at 420) the menu item that is in the selection window. Selecting the menu item, in some embodiments, causes instructions associated with the selected menu item to be performed, such as performing a command, opening a submenu, or activating a user interface tool. After selecting the menu item, the process ends.

When the cursor is not over the selection window, the process determines (at 425) whether the cursor is to the right of the selection window. Stage 520 of FIG. 5 illustrates this case. Cursor 515 is located to the right of selection window 505 and over the partially displayed item 545. When the cursor is to the right of the selection window at the time of the click, the process scrolls (at 430) the menu items to the left by one item. This causes the menu item that was previously to the right of the selection window to be displayed in the selection window.

Stage 530 of FIG. 5 illustrates the result of receiving a click of a mouse button while cursor 515 is at the location shown at 520. As a result of the click, item 545 is now in selection window 505, item 540 is only partially shown to the left of the selection window, and a new item 550 is now partially displayed to the right of the selection window.

Returning to process 400, when the cursor is not to the right of the selection window, the process scrolls (at 440) the menu items to the right by one item, as the cursor must be to the left of the selection window (since it is neither over the selection window nor to the right of the selection window). This causes the menu item that was previously to the left of the selection window to be displayed in the selection window.

One of ordinary skill in the art will recognize that other embodiments could receive different inputs rather than single mouse clicks for menu item selection and scrolling. Examples of such inputs include other mouse inputs (e.g., double-clicks, clicks combined with keyboard inputs, etc.), keyboard inputs (e.g., the left and right arrow keys for scrolling and the <Enter> key for selection), touchscreen or touchpad inputs, etc. In fact, some embodiments that use touchscreens do not actually use a cursor. Instead, to advance the menu by one item to the right, a user could tap on the left side of the menu, and to advance the menu by one item to the left, the user could tap on the right side of the menu. Selection could then be performed by a tap or double-tap on the selection window.

Furthermore, one of ordinary skill will recognize that process 400 is an example of one possible process performed by some embodiments in order to scroll the menu by one item with each mouse click. Process 400 is not necessarily the only example of how computer instructions can display such a menu and translate input for the menu. For instance, operations 415, 425, and 435 need not necessarily be performed in the order shown in FIG. 4. Some embodiments might also include three separate sets of computer instructions depending on where the cursor is located when the mouse click input is received, rather than all of the three relevant locations being handled by one set of instructions.

B. Continuous Scrolling of Menu Items

Figure 6:
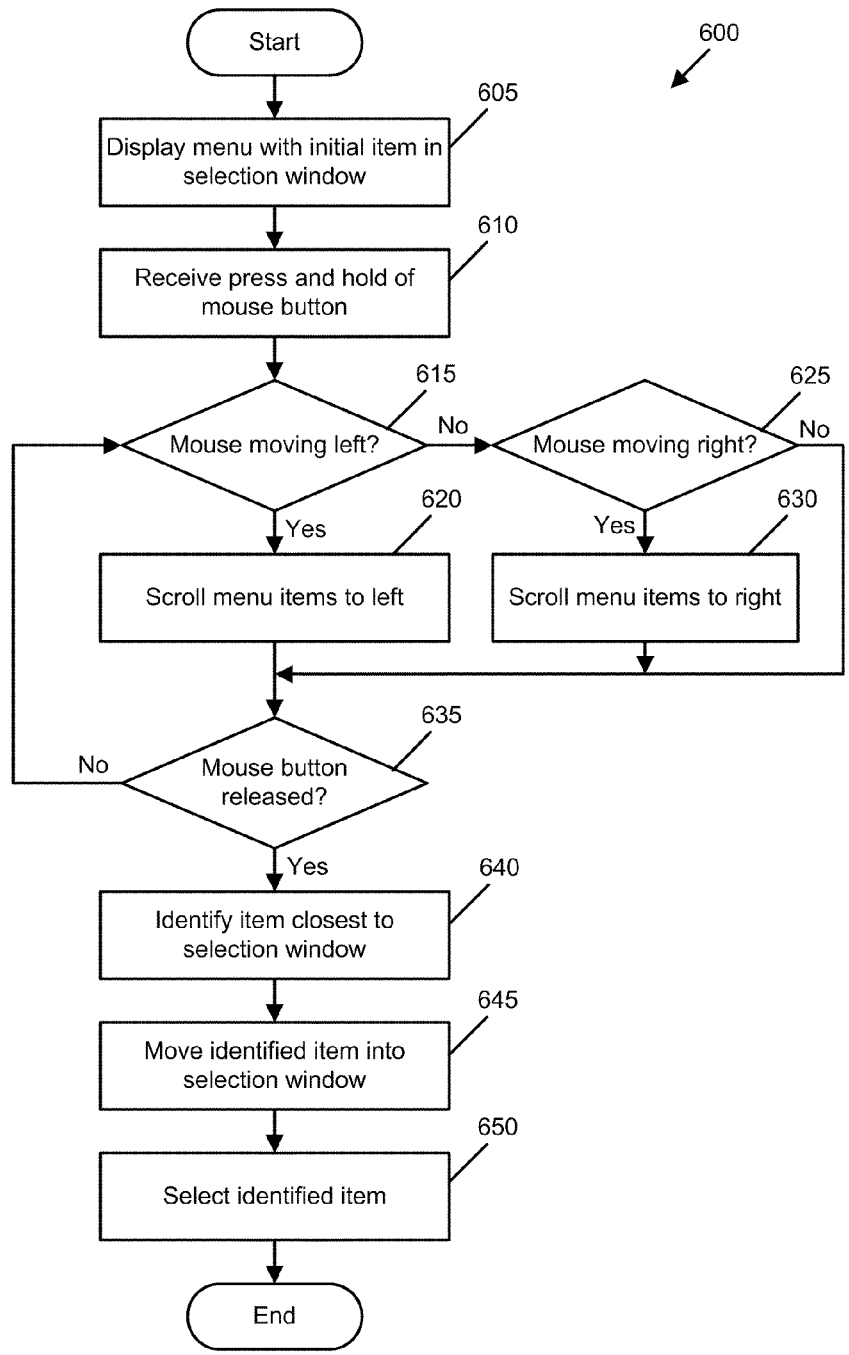
FIG. 6 conceptually illustrates a first process of some embodiments for navigating a menu based on click-and-drag input from a cursor controller.

FIG. 6 conceptually illustrates a process 600 of some embodiments for navigating a menu based on a click-and-drag input from a cursor controller. Specifically, according to process 600, the menu items are scrolled continuously in response to the click-and-drag input and when the input is finished the item closest to the selection window is selected. Process 600 will be described by reference to FIG. 7, which illustrates the navigation of such a menu 700 of some embodiments.

Figure 7:
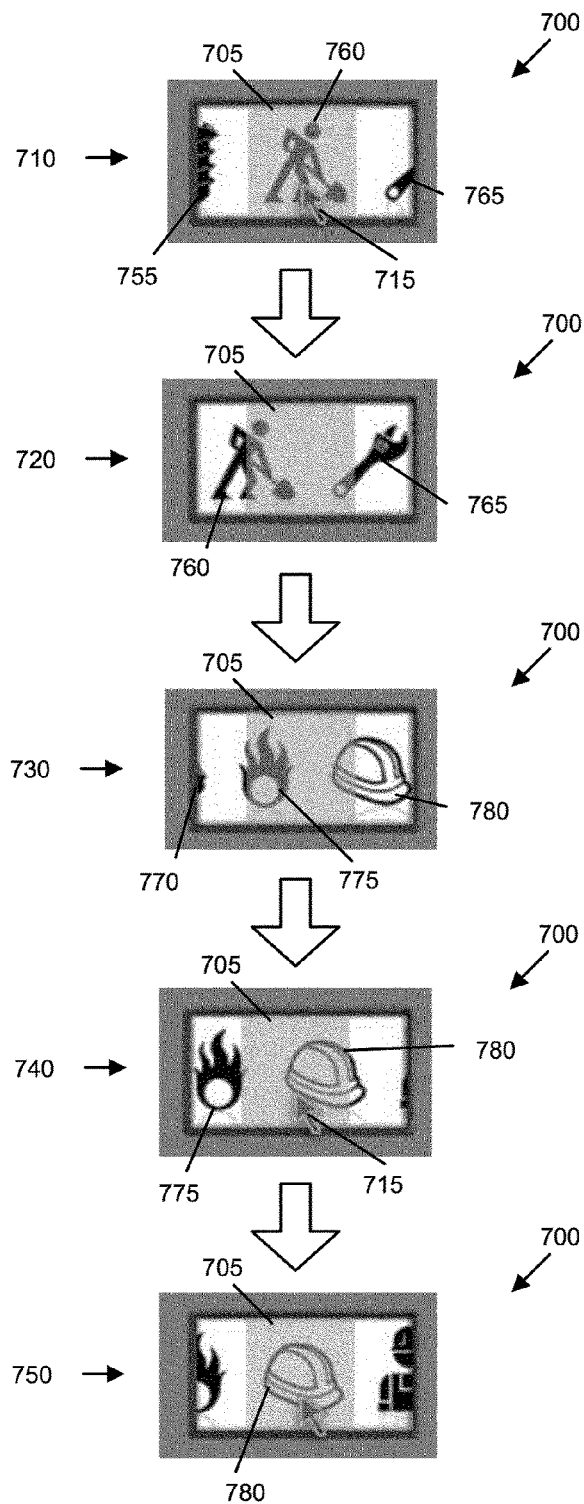
FIG. 7 illustrates the navigation of a menu according to the process of FIG. 6.

FIG. 7 illustrates five stages, 710, 720, 730, 740, and 750. Stage 710 illustrates the menu 700 as initially displayed with a cursor 715, stages 720 and 730 illustrate the menu 700 while a mouse button is held down and the mouse is moved in order to scroll the menu, stage 740 illustrates the menu 700 as the button is released, and 750 illustrates the menu 700 shortly after the release of the mouse button.

As shown, process 600 begins by displaying (at 605) a menu with an initial item in a selection window of the menu. The menu, in some embodiments, includes a number of menu items that have a particular order. Some embodiments order the menu items from a first item to a last item, whereas other embodiments only order the menu items relative to each other. In the latter case, the menu items can be navigated in an infinite loop.

As in FIG. 7, some embodiments display only the selection window, an item in the selection window, and portions of the menu items to either side of the selection window. Stage 710 illustrates selection window 705 with item 760. Item 760 is the item initially displayed in selection window 705. At stage 710, item 755 is partially displayed to the left of item 760 and item 765 is partially displayed to the right of item 760. Item 755 is one item prior to item 760 in the order for the menu items and item 765 is one item after item 760.

Process 600 next receives (at 610) a press and hold of a mouse button. The mouse button could be a left mouse button (when the process is performed on a system recognizing input from two or more mouse buttons) or from a button that is the only button on the mouse (when the process is performed on a one-button system). One of ordinary skill in the art will understand that similar processes may receive similar input from other types of input devices, as described below. In some embodiments, the process requires that the cursor be over the menu when the mouse button is pressed down in order to translate mouse movement into menu scrolling and selection.

The process determines (at 615) whether the mouse is moving left. When the mouse is moving left, the process scrolls (at 620) the menu items to the left. This causes the menu item that was previously in the selection window to start moving to the left as the menu item displayed to the right begins to move into the selection window. The left-most displayed menu item moves out of the menu display as an item moves into the display from the right side. The process then proceeds to 635, which is described below.

When the mouse is not moving left, the process determines (at 625) whether the mouse is moving right. When the mouse is moving right, the process scrolls (at 630) the menu items to the right. This causes the menu item that was previously in the selection window to start moving to the right as the menu item displayed to the left begins to move into the selection window. The right-most displayed menu item moves out of the display as an item moves into the display from the left side.

FIG. 7 illustrates the case where input is received indicating that the mouse is being moved to the left. At stage 710, cursor 715 is visible over selection window 705. Stage 720 illustrates menu 700 shortly after the mouse button is pressed and a user begins moving the mouse to the right. Menu item 755 is no longer displayed at all, menu item 760 is no longer centered in selection window 705, and menu item 765 is now fully displayed.

Cursor 715 is no longer visible at this stage. Some embodiments do not display the cursor while the mouse button is held down, as the actual movement shown on the screen is in the direction opposite the mouse movement. Some embodiments display the cursor as unmoving over the selection window, to simulate the idea that the selection window is being dragged by the mouse movement over static menu items. In some such embodiments, rather than left mouse movement moving the menu items left, the menu items move in a direction opposite the mouse movement.

Stage 730 illustrates the menu 700 after a user has continued to move the mouse to the left, thereby causing the menu items to scroll to the left. Stage 730 illustrates a menu item 770 that has moved almost completely out of the display, menu item 775 that is just leaving the selection window, and menu item 780 that is almost fully displayed and just entering the selection window.

Returning to FIG. 6, process 600 next determines (at 635) whether input has been received indicating that the mouse button has been released. When the mouse button is not released, the process returns to 615 to continue processing mouse input. In some embodiments, a user can move the mouse back and forth, thereby moving the menu items both left and right. Thus, if a user scrolls the menu too far, they can move the mouse in the other direction, causing the menu to scroll back to the desired menu item.

Once the mouse button is released, the process identifies (at 640) the menu item that is closest to the selection window. Stage 740 of FIG. 7 illustrates the menu 700 immediately after the mouse button is released. The release of the mouse button is indicated by cursor 715 becoming visible again. At this point, menu item 775 has mostly been scrolled out of the selection window, while menu item 780 is most of the way into the selection window. As menu item 780 is the closest to being centered in the selection window, process 600 would identify item 780.

The process then moves (at 645) the identified item into the selection window. Stage 750 of FIG. 7 illustrates the result of the menu item 780 being moved into the selection window after the mouse button is released. Some embodiments display the menu as moving very quickly between the release of the mouse button and the centering of the identified item (e.g., between stages 740 and 750). Other embodiments simply redraw the menu with the identified item centered in the selection window—the menu items are not displayed as moving but rather are displayed at the location where the mouse button is released and then immediately displayed with the identified item in the selection window.

Next, the process selects (at 650) the identified menu item. Selecting the menu item, in some embodiments, causes instructions associated with the selected menu item to be performed, such as performing a command, opening a submenu, or activating a user interface tool. Some embodiments also include an item the selection of which simply closes the menu and causes no other instructions to be performed. Such an option enables a user to decide during the menu navigation process that no menu item should be selected, so the user can then scroll through to the close menu option and select that instead. After selecting the menu item, the process ends.

One of ordinary skill in the art will recognize that other embodiments could receive different inputs rather than a user holding down a mouse button and moving the mouse for menu item selection and scrolling. Examples of such inputs include other mouse inputs (e.g., double-clicking before holding a button down, etc.), keyboard inputs (e.g., holding down the left and right arrow keys), touchscreen or touchpad inputs, etc. In fact, some embodiments that use touchscreens do not actually use a cursor. Instead, a user could press down over the menu on the touchscreen with one finger, then move the menu in either direction by moving the finger to the right or left.

Furthermore, one of ordinary skill will recognize that process 600 is an example of one possible process performed by some embodiments in order to scroll the menu by holding down a mouse button. Process 600 is not necessarily the only example of how computer instructions can display such a menu and translate input for the menu. For instance, operations 615 and 625 need not necessarily be performed in the order shown in FIG. 6.

Some embodiments might also utilize different techniques to determine which item should be selected when the mouse button is released. Rather than identifying the item closest to the selection window, some embodiments identify the item that was most recently fully centered (i.e., the item leaving the selection window as the user releases the mouse button). Similarly, some embodiments identify the item that most recently started entering the selection window (i.e., the item entering the selection window as the user releases the mouse button).

C. Selection Window that Moves with Scrolling Menu Items

Figure 8:
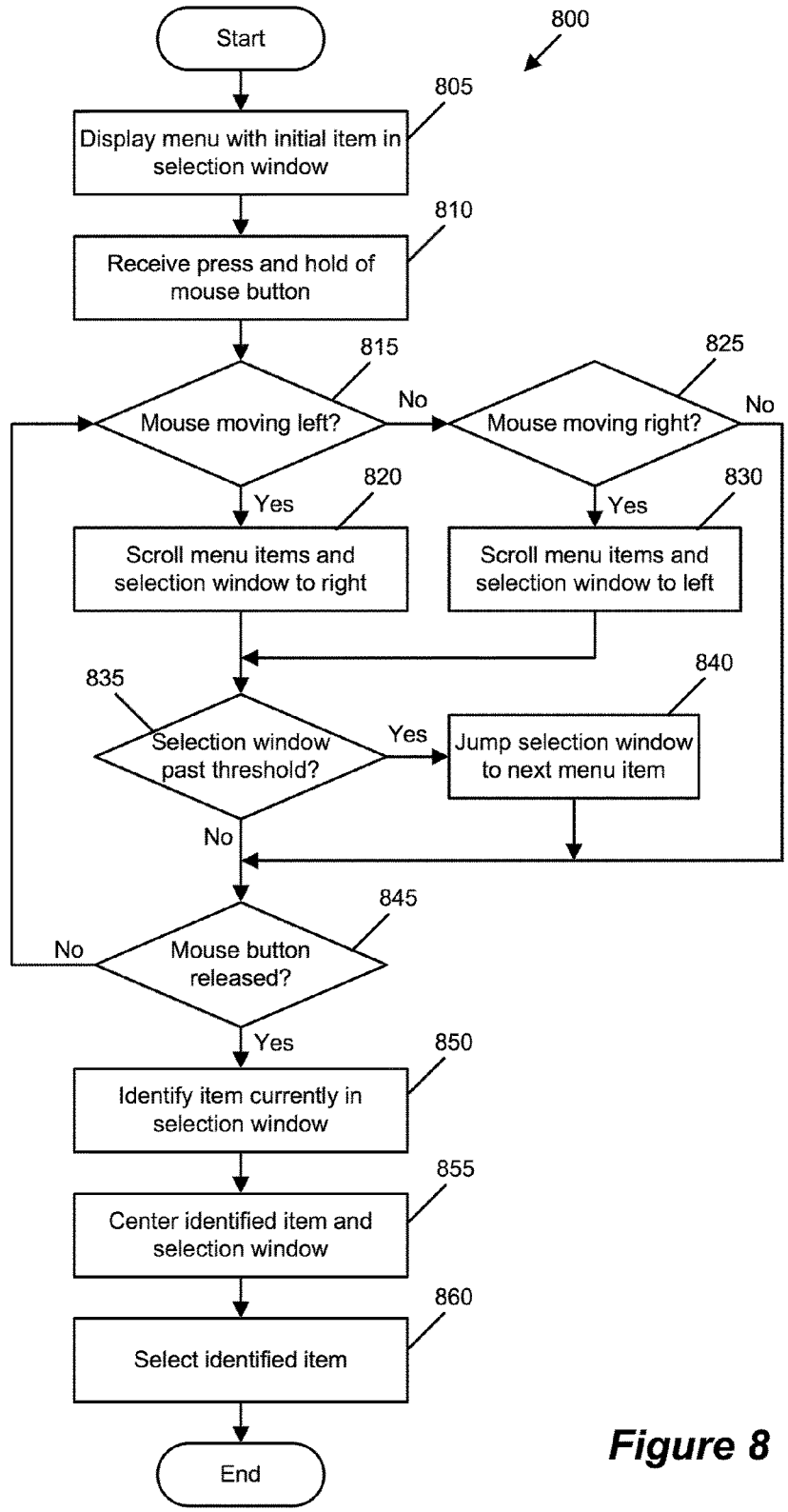
FIG. 8 conceptually illustrates a second process of some embodiments for navigating a menu based on click-and-drag input from a cursor controller.

FIG. 8 conceptually illustrates a process 800 of some embodiments for navigating a menu based on a click-and-drag input from a cursor controller. Specifically, according to process 600, the menu items are scrolled continuously in response to the click-and-drag input as a selection window moves with a menu item up to a threshold point and then jumps to the next menu item. When the input is finished the item presently in the selection window is selected. Process 800 will be described by reference to FIG. 9, which illustrates the navigation of such a menu 900 of some embodiments.

Figure 9:
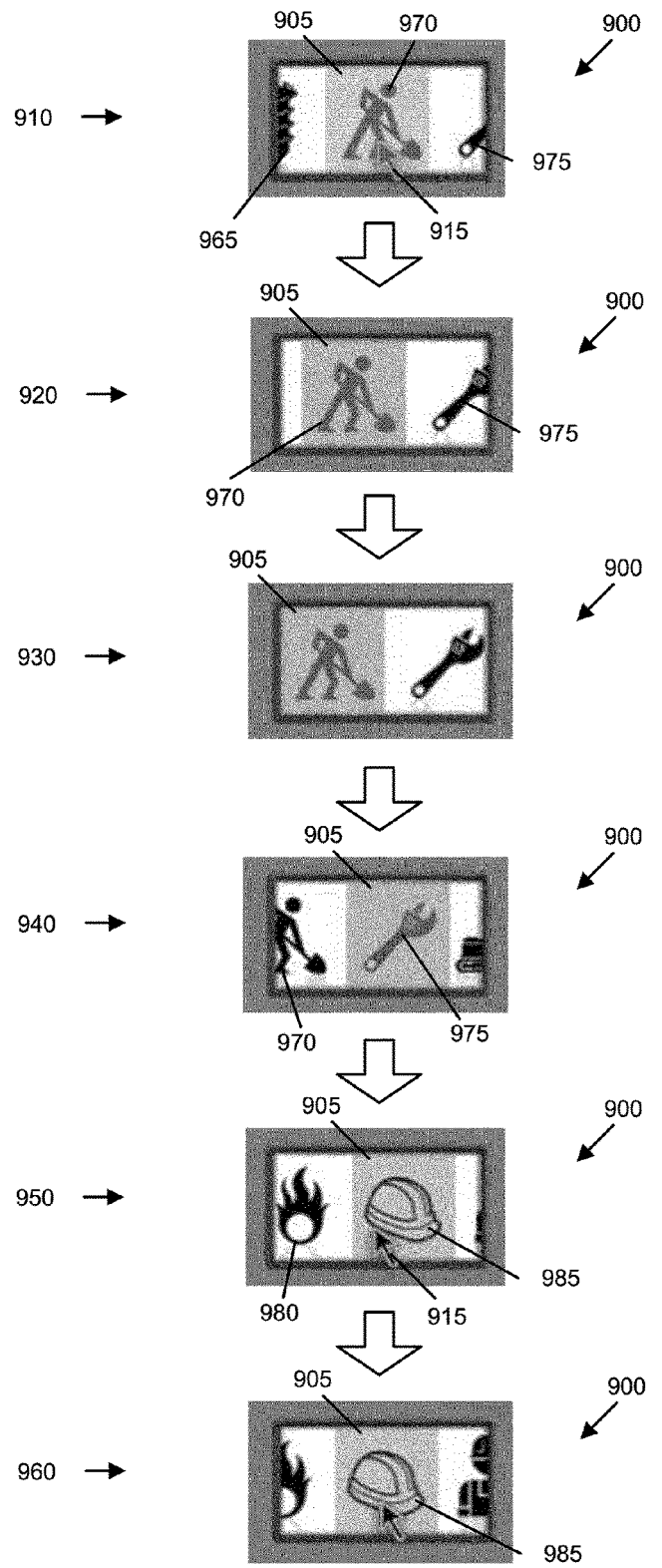
FIG. 9 illustrates the navigation of a menu according to the process of FIG. 8.

FIG. 9 illustrates six stages, 910, 920, 930, 940, and 950. Stage 910 illustrates the menu 900 as initially displayed with a cursor 915, stages 920, 930, and 940 illustrate the menu 900 while a mouse button is held down and the mouse is moved in order to scroll the menu, stage 950 illustrates the menu 900 as the button is released, and 960 illustrates the menu 900 shortly after the release of the mouse button.

As shown, process 800 begins by displaying (at 805) a menu with an initial item in a selection window of the menu. The menu, in some embodiments, includes a number of menu items that have a particular order. Some embodiments order the menu items from a first item to a last item, whereas other embodiments only order the menu items relative to each other. In the latter case, the menu items can be navigated in an infinite loop.

As shown in FIG. 9, some embodiments display only the selection window, an item in the selection window, and portions of the menu items to either side of the selection window. Stage 910 illustrates selection window 905 with item 970. Item 970 is the item initially displayed in selection window 905. At stage 910, item 965 is partially displayed to the left of item 970 and item 975 is partially displayed to the right of item 970. Item 965 is one item prior to item 970 in the order for the menu items and item 975 is one item after item 970.

Process 800 next receives (at 810) a press and hold of a mouse button. The mouse button could be a left mouse button (when the process is performed on a system recognizing input from two or more mouse buttons) or from a button that is the only button on the mouse (when the process is performed on a one-button system). One of ordinary skill in the art will understand that similar processes may receive similar input from other types of input devices, as described below. In some embodiments, the process requires that the cursor be over the menu when the mouse button is pressed down in order to translate mouse movement into menu scrolling and selection.

The process determines (at 815) whether the mouse is moving left. When the mouse is moving left, the process scrolls (at 820) the menu items and the selection window to the right. As the menu items move, the selection window moves with them, rather than staying in place with the items moving through the window. The process then proceeds to 835, which is described below. The rightmost displayed menu item moves out of the display as an item moves into the display from the left side.

When the mouse is not moving left, the process determines (at 825) whether the mouse is moving right. When the mouse is moving right, the process scrolls (at 830) the menu items and the selection window to the left. As the menu items move, the selection window moves with them, rather than staying in place with the items moving through the window. The leftmost displayed menu item moves out of the display as an item moves into the display from the left side. When the mouse is moving neither left nor right, the process does not scroll the menu items in either direction, and proceeds to 845, which is described below.

FIG. 9 illustrates the case where input is received indicating that the mouse is being moved to the right while the mouse button is held down. At stage 910, cursor 915 is visible over selection window 905. Stage 920 illustrates menu 900 shortly after the mouse button is pressed and a user begins moving the mouse to the right. Menu item 965 is no longer displayed at all, menu item 970 is no longer centered in the menu display, and menu item 975 is close to being fully displayed.

Cursor 915 is no longer visible at this stage. Some embodiments do not display the cursor while mouse button is held down, as the actual movement shown on the screen is in the direction opposite the mouse movement. Some embodiments display the cursor moving with the selection window.

Referring to FIG. 8, process 800 next determines (at 835) whether the selection window has been moved past a threshold. When the selection window has moved past the threshold, the process jumps (at 840) the selection window to the next menu item. When the menu items are moving to the right, the next menu item is the item to the left of the selection window. Correspondingly, when the menu items are moving to the left, the next menu item is the item to the right of the selection window.

In some embodiments, the threshold is the point at which the selection window would be moving out of the display. This is especially applicable to menu displays that only allow for the display of a small number of menu items. Some embodiments define the threshold as the point at which the next menu item would take up more than half of the selection window if the selection window was not moving.

Stage 930 of FIG. 9 illustrates that menu 900 has been scrolled left to the point that selection window 905 has reached the left edge of the display, which is the threshold for this menu display. Stage 940 illustrates the result of scrolling the menu further to the left, which is that selection window 905 has jumped from menu item 970 to menu item 975. To jump the selection window to the next item, some embodiments display the selection window as moving very quickly between one item and the next. Other embodiments simply redraw the menu with the selection window over the next item—the selection window is not displayed as moving but rather is displayed over the first item and then immediately displayed over the next item.

Process 800 next determines (at 845) whether input has been received indicating that the mouse button has been released. When the mouse button is not released, the process returns to 815 to continue processing mouse input. In some embodiments, a user can move the mouse back and forth, thereby moving the menu items both left and right. Thus, if a user scrolls past a desired menu item, they can move the mouse in the opposite direction, causing the menu to scroll back to the desired item.

Once the mouse button is released, the process identifies (at 850) the item that is currently in the selection window. Stage 950 of FIG. 9 illustrates the menu 900 immediately after the mouse button is released. The release of the mouse button is indicated by cursor 915 becoming visible again. At this point, the selection window 905 has recently jumped from menu item 980 to item 985. As such, the process would identify item 985 as the menu item currently in selection window 905.

The process then centers (at 855) the identified item and the selection window in the menu display. Stage 960 illustrates the result of the menu item 985 and the selection window 905 being centered in the display for menu 900 after the mouse button is released. Some embodiments display the menu and selection window as moving very quickly between the release of the mouse button and the centering of the item and selection window (e.g., between stages 950 and 960). Other embodiments simply redraw the menu with the identified item and selection window centered—the menu items are not displayed as moving but rather are displayed at the location where the mouse button is released and then immediately displayed with the identified item and selection window centered.

Next, the process selects (at 860) the identified menu item. Selecting the menu item, in some embodiments, causes instructions associated with the selected menu item to be performed, such as performing a command, opening a submenu, or activating a user interface tool. Some embodiments also include an item the selection of which simply closes the menu and causes no other instructions to be performed. Such an option enables a user to decide during the menu navigation process that no menu item should be selected, so the user can then scroll through to the close menu option and select that instead. After selecting the menu item, the process ends.

One of ordinary skill in the art will recognize that other embodiments could receive different inputs rather than a user holding down a mouse button and moving the mouse for menu item selection and scrolling. Examples of such inputs include other mouse inputs (e.g., double-clicking before holding a button down, etc.), keyboard inputs (e.g., holding down the left and right arrow keys), touchscreen or touchpad inputs, etc. In fact, some embodiments that use touchscreens do not actually use a cursor. Instead, a user could press down over the menu on the touchscreen with one finger, then move the menu in either direction by moving the finger to the right or left.

Furthermore, one of ordinary skill will recognize that process 800 is an example of one possible process performed by some embodiments in order to scroll the menu by holding down a mouse button. Process 800 is not necessarily the only example of how computer instructions can display such a menu and translate input for the menu. For instance, operations 815 and 825 need not necessarily be performed in the order shown in FIG. 8. Some embodiments might also have two separate sets of instructions for determining whether the selection window had passed a threshold—one set of instructions when the menu items are moving left and one set of instructions when the menu items are moving to the right.

D. Menu Items Jump to Selection Window

Figure 10:
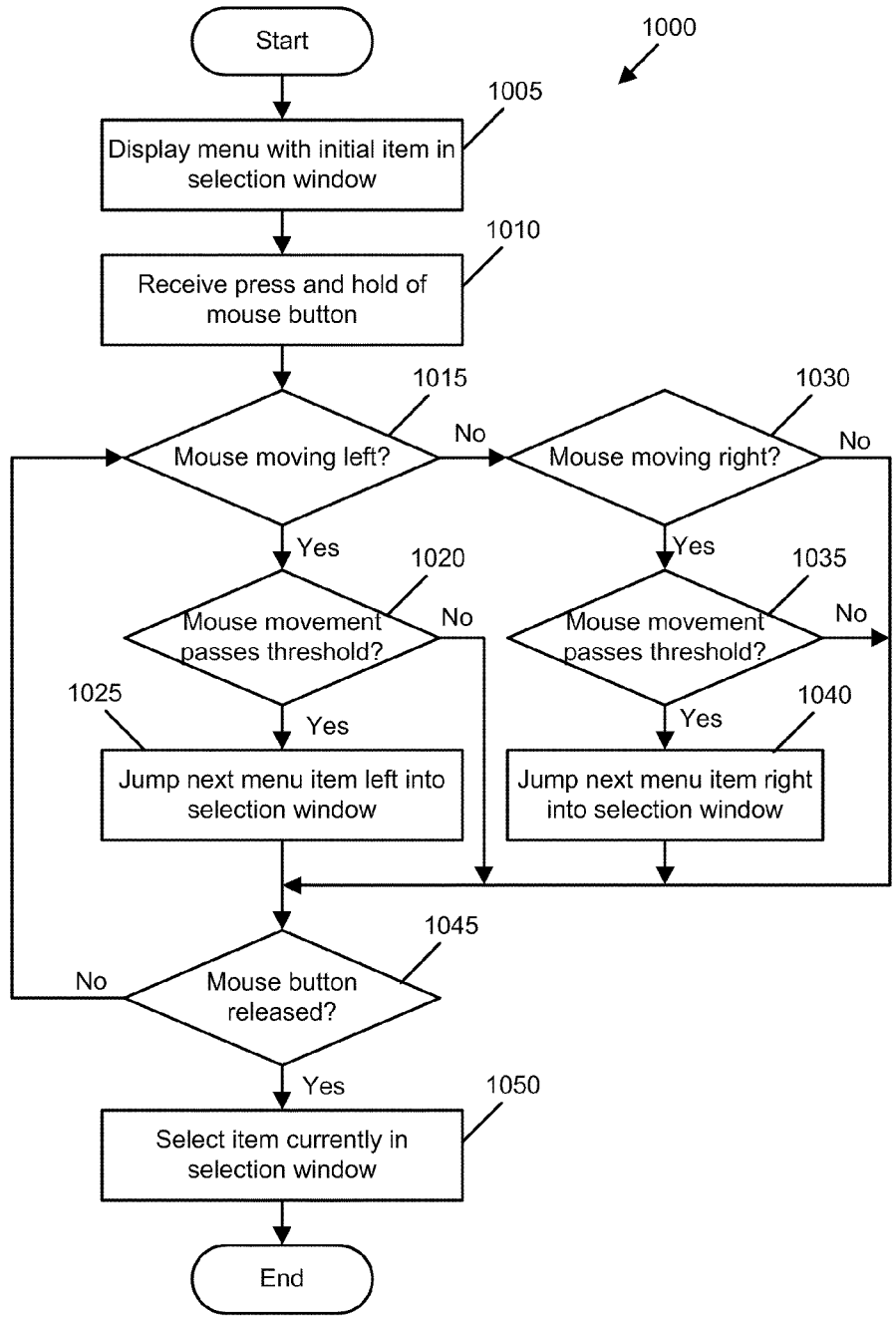
FIG. 10 conceptually illustrates a third process of some embodiments for navigating a menu based on click-and-drag input from a cursor controller.

FIG. 10 conceptually illustrates a process 1000 of some embodiments for navigating a menu based on a click-and-drag input from a cursor controller. Specifically, according to process 600, the menu items do not move as the cursor controller is being moved until a threshold amount of movement is reached, at which point the menu items are shifted by one item. Process 1000 will be described by reference to FIG. 11, which illustrates the navigation of such a menu 1100 of some embodiments.

Figure 11:
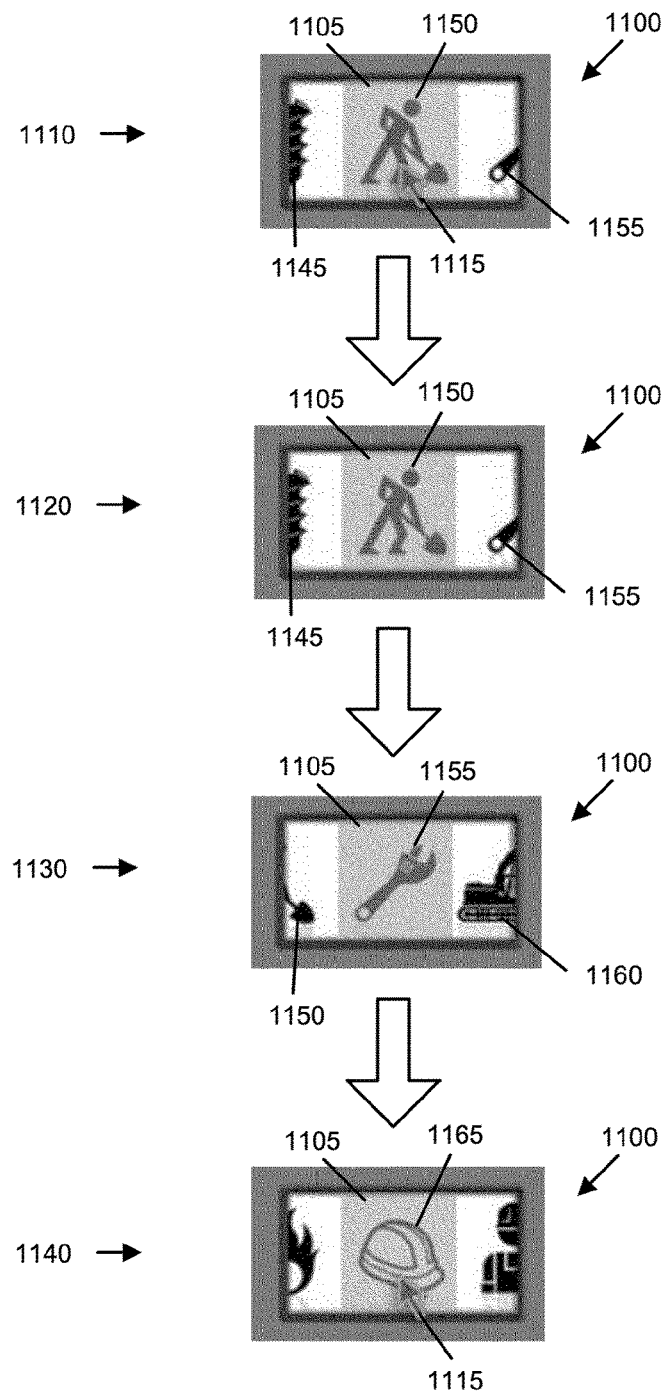
FIG. 11 illustrates the navigation of a menu according to the process of FIG. 10.

FIG. 11 illustrates four stages, 1110, 1120, 1130, and 1140. Stage 1110 illustrates the menu 1100 as initially displayed with a cursor 1115, stages 1120 and 1130 illustrate the menu 1100 while a mouse button is held down and the mouse is moved in order to scroll the menu, and stage 1140 illustrates the menu as the button is released.

As shown, process 1000 begins by displaying (at 1005) a menu with an initial item in a selection window of the menu. The menu, in some embodiments, includes a number of menu items that have a particular order. Some embodiments order the menu items from a first item to a last item, whereas other embodiments only order the menu items relative to each other. In the latter case, the menu items can be navigated in an infinite loop.

As in FIG. 11, some embodiments display only the selection window, an item in the selection window, and portions of the menu items to either side of the selection window. Stage 1110 illustrates selection window 1105 with item 1150. Item 1150 is the item initially displayed in selection window 1105. At stage 1110, item 1145 is partially displayed to the left of item 1150 and item 1155 is partially displayed to the right of item 1150. Item 1145 is one item prior to item 1150 in the order for the menu items and item 1155 is one item after item 970.

Process 1000 next receives (at 1010) a press and hold of a mouse button. The mouse button could be a left mouse button (when the process is performed on a system recognizing input from two or more mouse buttons) or from a button that is the only button on the mouse (when the process is performed on a one-button system). One of ordinary skill in the art will understand that similar processes may receive similar input from other types of input devices, as described below. In some embodiments, the process requires that the cursor be over the menu when the mouse button is pressed down in order to translate mouse movement into menu scrolling and selection.

The process determines (at 1015) whether the mouse is moving left. When the mouse is moving left, the process determines (at 1020) whether the mouse movement passes a threshold. When the mouse movement has passed the threshold, the process jumps (at 1025) the next menu item leftwards into the selection window. This causes the entire menu to shift to the left by one item. In some embodiments, the threshold amount of mouse movement is a constant that is based on the amount of mouse movement that would be required to move the cursor a particular distance on the display. Some embodiments vary the threshold amount based on how fast the mouse is moving, allowing a user to more quickly move through the menu by using faster mouse movements. The process then proceeds to 1045, which is described below.

When the mouse is not moving left, the process determines (at 1030) whether the mouse is moving right. When the mouse is not moving right (i.e., a user is holding the mouse button down but not moving the mouse), the process proceeds to 1045, which is described below. Otherwise, the process determines (at 1035) whether the mouse movement passes a threshold. When the mouse movement has passed the threshold, the process jumps (at 1040) the next menu item rightwards into the selection window. This causes the entire menu to shift to the right by one item. In some embodiments, the threshold amount of mouse movement is a constant that is based on the amount of mouse movement that would be required to move the cursor a particular distance on the display. Some embodiments vary the threshold amount based on how fast the mouse is moving, allowing a user to more quickly move through the menu by using faster mouse movements.

FIG. 11 illustrates the case where input is received indicating that the mouse is being moved to the left. At stage 1110, cursor 1115 is visible over the selection window 1105. Stage 1120 illustrates menu 1100 shortly after the mouse button is pressed and a user begins moving the mouse to the left. Although the mouse has started moving, because the mouse has not been moved by at least a threshold amount, the menu items 1145, 1150, and 1155 have not been moved at all.

Cursor 1115 is no longer visible at this stage. Some embodiments do not display the cursor while mouse button is held down. Some embodiments display the cursor as unmoving over the selection window, to simulate the idea that the selection window is being dragged by the mouse movement over static menu items. In some such embodiments, rather than left mouse movement moving the menu items left, the menu items move in a direction opposite the mouse movement.

Stage 1130 illustrates the menu 1100 after a user has moved the mouse far enough to the right to cause the menu items to shift to the left by one item. Stage 1130 illustrates that menu item 1155 is now in selection window 1105, menu item 1150 has moved from the selection window to being partially displayed to the left of selection window 1105, and menu item 1160 has appeared from the right and is partially displayed to the right of selection window 1105. Some embodiments display the menu as moving very quickly when shifting the menu to either the right or left. Other embodiments simply redraw the menu with the items shifted as soon as the the mouse movement passes the threshold rather than displaying the movement of the menu items at all.

Returning to FIG. 10, process 1000 next determines (at 1045) whether input has been received indicating that the mouse button has been released. When the mouse button is not released, the process returns to 1015 to continue processing mouse input. In some embodiments, a user can move the mouse back and forth, thereby moving the menu items both left and right. Thus, if a user scrolls past a desired menu item, they can move the mouse in the opposite direction, causing the menu to scroll back to the desired item.

Next, the process selects (at 1050) the item that is currently in the selection window. Selecting the menu item, in some embodiments, causes instructions associated with the selected menu item to be performed, such as performing a command, opening a submenu, or activating a user interface tool. Some embodiments also include an item the selection of which simply closes the menu and causes no other instructions to be performed. Such an option enables a user to decide during the menu navigation process that no menu item should be selected, so the user can then scroll through to the close menu option and select that instead. After selecting the menu item, the process ends.

Stage 1140 of FIG. 11 illustrates the menu 1100 immediately after the mouse button is released. The release of the mouse button is indicated by cursor 1115 becoming visible again. At this point, menu item 1165 has been recently moved into selection window 1105. As such, the process would select item 1165 as the item currently in the selection window.

One of ordinary skill in the art will recognize that other embodiments could receive different inputs rather than a user holding down a mouse button and moving the mouse for menu item selection and scrolling. Examples of such inputs include other mouse inputs (e.g., double-clicking before holding a button down, etc.), keyboard inputs (e.g., holding down the left and right arrow keys), touchscreen or touchpad inputs, etc. In fact, some embodiments that use touchscreens do not actually use a cursor. Instead, a user could press down over the menu on the touchscreen with one finger, then move the menu in either direction by moving the finger to the right or left.

Furthermore, one of ordinary skill will recognize that process 1000 is an example of one possible process performed by some embodiments in order to scroll the menu by holding down a mouse button. Process 1000 is not necessarily the only example of how computer instructions can display such a menu and translate input for the menu. For instance, operations 1015 and 1030 need not necessarily be performed in the order shown in FIG. 6.

The four processes described above all either move the menu items right or left in response to cursor controller input to the right or left (either click input right or left of the selection window or drag input in either direction). One of ordinary skill in the art will recognize that different embodiments will move the menu items in different directions in response to left or right input. That is, in some embodiments that display menu item movement according to process 600, moving the mouse to the right will cause the menu items to move to the right. In other such embodiments, moving the mouse to the right will cause the menu items to move to the left. Equivalent variants are possible for processes 400, 800, or 1000.

The four processes and variants thereof are not exhaustive of the possibilities for scrolling through menus of the type shown above and below. For example, various touchscreen or touchpad interactions could be used to scroll through a menu and to select an item from the menu. Using a touchpad, a user could repeatedly use swipe gestures (e.g., a two finger swipe) in either direction while a cursor is over the menu in order to scroll the menu. The number of menu items scrolled through by a single swipe gesture would be dependent upon the speed and length of the swipe gesture in some embodiments. A different input, such as a double tap with the cursor over the selection window, could then be used to select an item from the menu. Similarly, swipe gestures over a menu on a touchscreen could be used (without a cursor) to scroll through the menu items. Like the touchpad example given above, the number of menu items scrolled through by a single swipe gesture would be dependent on the speed and length of the swipe gesture in some embodiments. A user tapping quickly, or double-tapping (or some other gesture) on an item in the selection window could be used to select an item.

E. Other Menu Features

As mentioned above, selection of a menu item causes instructions associated with the selected menu item to be performed in some embodiments. In some embodiments, the instructions activate a particular tool. For instance, in some embodiments the menu is part of a video-editing application. The menu items could be video-editing tools (e.g., blade, ripple, slip, razor, etc.) or different transition options (e.g., dissolve, fade, etc. In some embodiments, the menu item instructions cause a command to be performed. For instance, in some embodiments, the menu items represent the typical drop-down menu options of an application (e.g., a "File" menu with "Save", "Print", "Open", etc. options).

In some embodiments, one or more of the menu items causes a sub-menu to open when selected. In the cases where the menu is navigated through a user pressing and holding a cursor controller selection button down and then moving the cursor controller in order to scroll the menu items through a selection window (e.g., the menus described in subsections B-D above), some embodiments select a particular item that opens a submenu when a user stops moving the mouse while the particular item is in the selection window.

Figure 12:
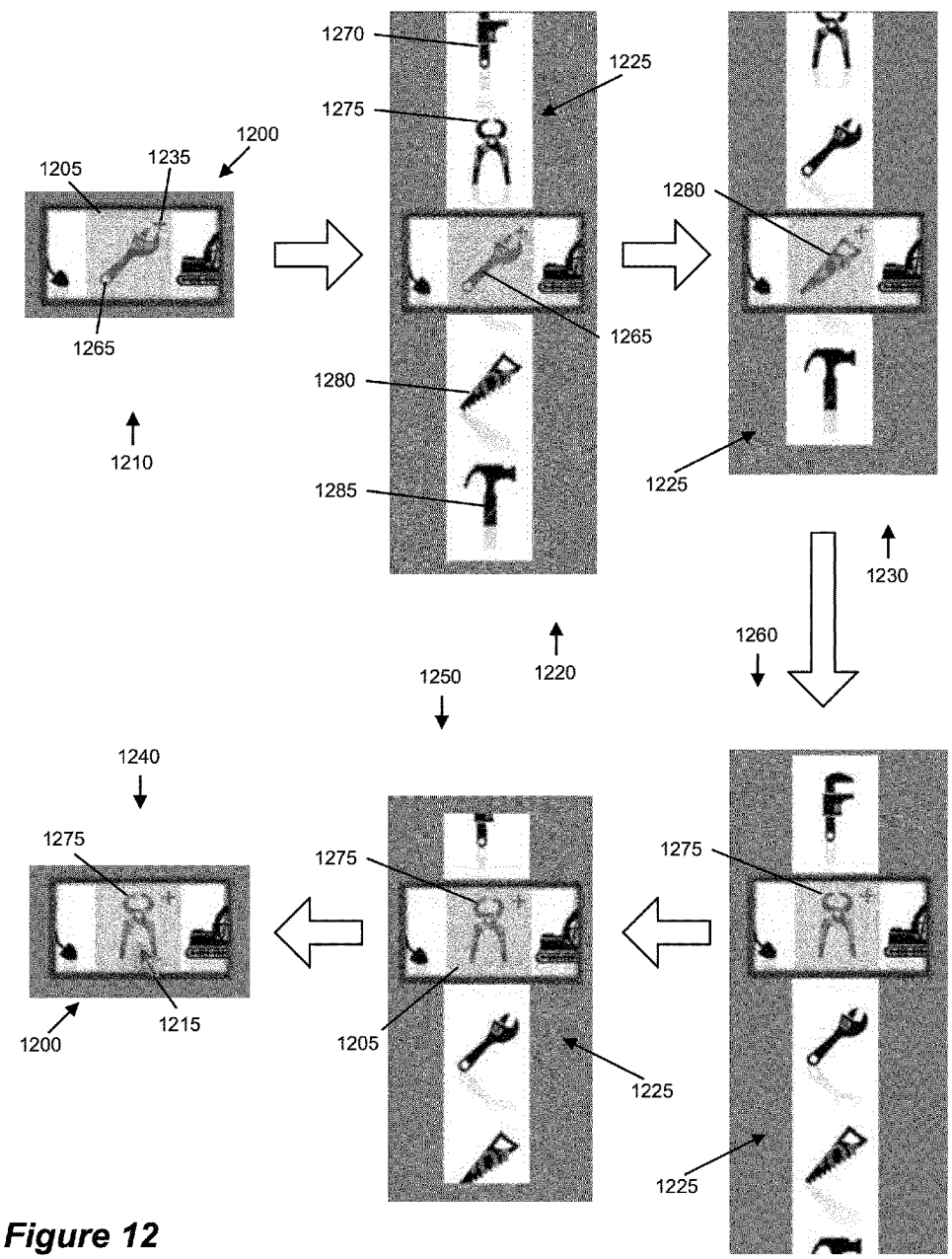
FIG. 12 illustrates an example of the navigation of a menu and sub-menu of some embodiments.

FIG. 12 illustrates an example of the navigation of a menu 1200 and a sub-menu 1225 of some embodiments. FIG. 12 illustrates six stages, 1210, 1220, 1230, 1240, 1250, and 1260. Stage 1210 illustrates the menu 1200 with a menu item 1265 in a selection window 1205, stages 1220, 1230, and 1240 illustrate the navigation of sub-menu 1225 that is opened as a result of selecting menu item 1265, and stages 1250 and 1260 illustrate the result of selecting a menu item 1275 from the sub-menu 1225.

Stage 1210 illustrates the menu 1200 with an item 1265 in selection window 1205. Menu item 1265 is not the menu item initially displayed in selection window 1205. Instead, a user has scrolled through the various menu items in menu 1200 to get item 1265 in selection window 1205. The menu could be navigated via single-clicks of a mouse button (e.g., according to a process such as process 400), via a user pressing and holding a mouse button while moving the mouse back and forth (e.g., according to a process such as process 600, 800, or 1000), or via some other process.

Menu item 1265 includes a small plus sign 1235. In some embodiments, such a symbol is used to graphically indicate that the selection of a menu item will cause a sub-menu to open. Other graphical indicators may be used by some embodiments, such as arrows, letters, etc. Other embodiments do not use graphical indicators, instead assuming that the user will know which menu items cause sub-menus to open. As shown in the following stages, some embodiments leave the graphical indicator in the selection window as the user scrolls through the sub-menu. Other embodiments, however, leave the graphical indicator with the particular item that causes the sub-menu to open as the user scrolls through the sub-menu.

For menus that behave according to process 400 (or similarly), some embodiments open a sub-menu as soon as its corresponding menu item (i.e., the menu item whose selection causes the sub-menu to open) is moved into the selection window. Other embodiments require the selection of the particular menu item (e.g., by clicking on the menu item in the selection window). The sub-menu is then navigated via input similar to the input used for the initial menu (i.e., if the initial menu is navigated via single-clicks, then so is the sub-menu in some embodiments).

For menus that behave according to one of processes 600, 800, or 1000 (or according to a similar process), some embodiments also open a sub-menu as soon as its corresponding menu item is moved into the selection window. Other embodiments, though, require the user to keep the particular menu item in the selection window for a threshold amount of time (i.e., by not moving the mouse once the particular menu item is in the selection window). Once the sub-menu opens, some embodiments allow the user to navigate the sub-menu by continuing to hold down the mouse button and moving the mouse up and down (when the sub-menu opens vertically).

Stage 1220 illustrates the opened sub-menu 1225. Sub-menu 1225 opens vertically. When the sub-menu initially opens, item 1265 remains in selection window 1205. In some cases, the item from the initial menu that caused the sub-menu to open is not selectable within the sub-menu. However, in other cases, this item may be selected within the sub-menu just like the rest of the sub-menu items.

As shown in stage 1220, sub-menu 1225 includes at least four items in addition to 1265: items 1270, 1275, 1280, and 1285. Some embodiments display the entire sub-menu at once, whereas other embodiments display only a portion of the sub-menu around the selection window (similar to how menu 1200 is displayed, except vertically).

Stage 1230 illustrates the sub-menu 1225 after a user has navigated to item 1280. A user could navigate to this point by clicking below the selection window in some embodiments. In other embodiments, the user could hold a mouse button down and move the mouse downwards. Stage 1260 illustrates the sub-menu 1225 after a user has navigated to item 1275 (two items up from item 1280). A user could navigate to this point by clicking above selection window or by moving the mouse upwards, depending on the process used to navigate menu 1200. In the examples shown, the menu is navigated by a user holding the mouse button down, as no cursor is visible.

Stage 1250 illustrates the process used by some embodiments to close a sub-menu when an item is selected from the sub-menu. Menu item 1275 has been selected (e.g., by a user releasing the mouse button while item 1275 is in the selection window 1205). As shown, the sub-menu 1225 begins closing around the selected item 1275. Stage 1240 illustrates menu 1200 after the sub-menu has fully collapsed, with item 1275 selected. As the user has released the mouse button, a cursor 1215 is now visible.

The menu 1200 shown in FIG. 12 has a primary orientation of horizontal scrolling, while the sub-menu 1225 opened from menu 1200 scrolls vertically. In some embodiments, sub-menus themselves also have sub-menus. Thus, if a user selected an item in sub-menu 1225 that itself opened a sub-menu, some embodiments would orient the new sub-menu horizontally. The items of the new sub-menu would be displayed over the original items from the primary menu in some embodiments such that the primary menu items are no longer visible. On the other hand, the menus of some embodiments have a primary orientation of vertical scrolling, and the sub-menus opened from such menus then scroll vertically.

Figure 13:
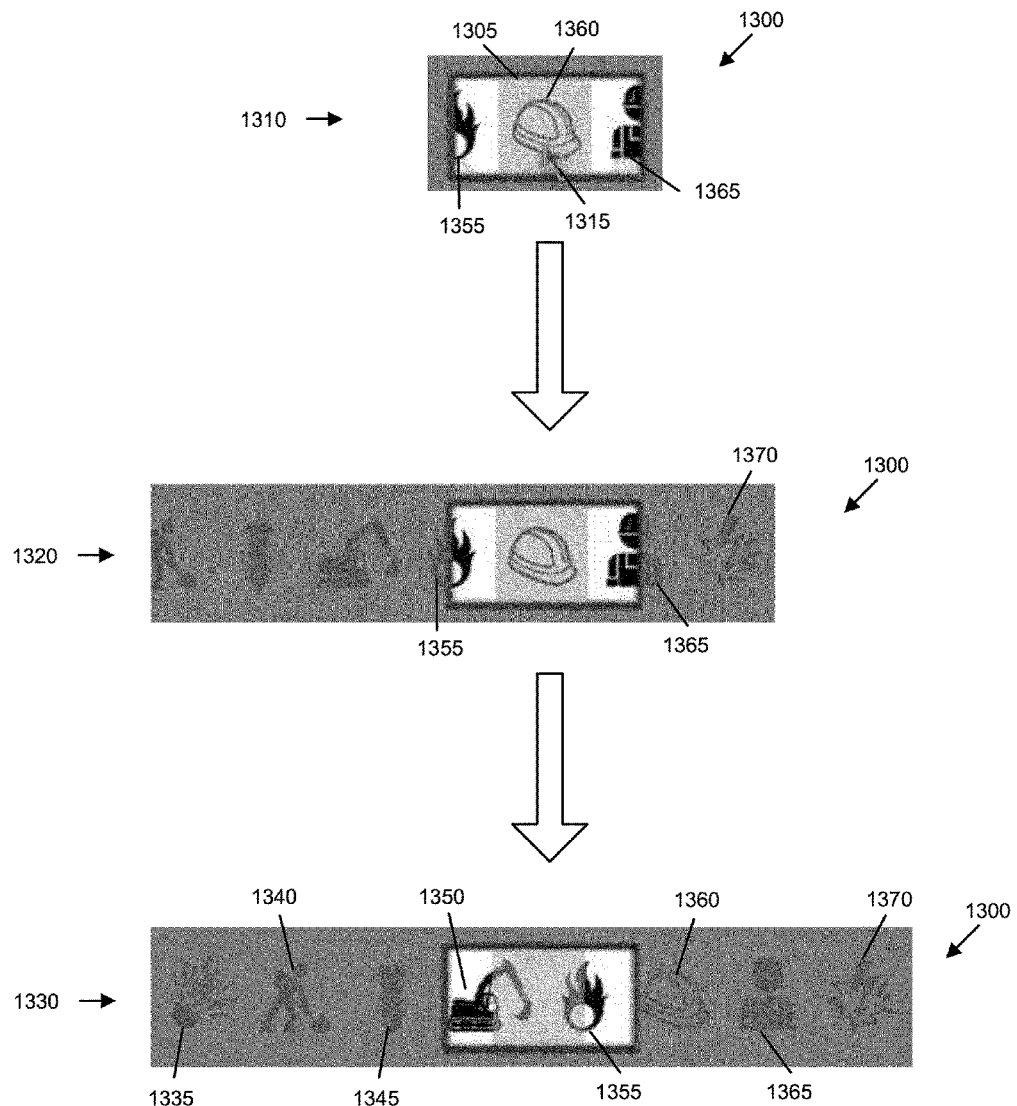
FIG. 13 illustrates a menu of some embodiments that displays menu items outside of a primary display as faded while a user scrolls through the menu.

FIG. 13 illustrates a menu 1300 of some embodiments that displays menu items outside of a primary display as faded while the user scrolls through the menu. FIG. 13 illustrates three stages, 1310, 1320, and 1330. As shown in stage 1310, menu 1300 includes a display similar to that of menus 500, 700, 900, and 1100. However, as shown in stages 1320 and 1330, when a user presses and holds a mouse button in order to navigate menu 1300, items outside the display appear in faded form.

Stage 1310 illustrates menu item 1360 in selection window 1305. Cursor 1315 is visible over item 1360, and portions of menu items 1355 and 1365 are visible to either side of selection window 1305. Menu 1300 is navigated by a user pressing and holding a mouse button, then moving the mouse left and right (e.g., according to a process such as process 600, 800, or 1000). Cursor 1315 is visible at this stage, indicating that the user has not yet pressed down the mouse button to navigate the menu.

Stage 1230 illustrates the sub-menu 1225 after a user has navigated to item 1280. A user could navigate to this point by clicking below the selection window in some embodiments. in other embodiments, the user could hold a mouse button down and move the mouse downwards. Stage 1260 illustrates the sub-menu 1225 after a user has navigated to item 1275 (two items up from item 1280). A user could navigate to this point by clicking above selection window or by moving the mouse upwards, depending on the process used to navigate menu 1200. in the examples shown, the menu is navigated by a user holding the mouse button down, as no cursor is visible.

Stage 1250 illustrates the process used by some embodiments to close a sub-menu when an item is selected from the sub-menu. Menu item 1275 has been selected (e.g., by a user releasing the mouse button while item 1275 is in the selection window 1205). As shown, the sub-menu 1225 begins closing around the selected item 1275. Stage 1240 illustrates menu 1200 after the sub-menu has fully collapsed, with item 1275 selected. As the user has released the mouse button, a cursor 1215 is now visible.

As mentioned above, the features described in the preceding section can be applied to menus that do not scroll linearly. The processes 400, 600, 800, and 1000 for navigating and selecting menu items can be applied to any sort of menu in which menu items are moved through a selection window, regardless of the shape of the menu. Menus need not be horizontal (or even vertical) for their menu items to cause submenus to open perpendicularly to the scrolling of the menu. Nor is their any requirement that a menu be linear in shape for menu items around the selection window to be displayed as partially faded or transparent.

II. Semi-Circular Menus

The examples in the preceding section all involved menus that scroll linearly. However, as noted, the described features of the menus are applicable equally to other sorts of menus. The following section describes various features of menus that are displayed as a semi-circle. The features described in this section are shown as applied to semi-circular menus, though one of ordinary skill will recognize that these many of these features could be applied to the linear menus shown above.

Figure 14:
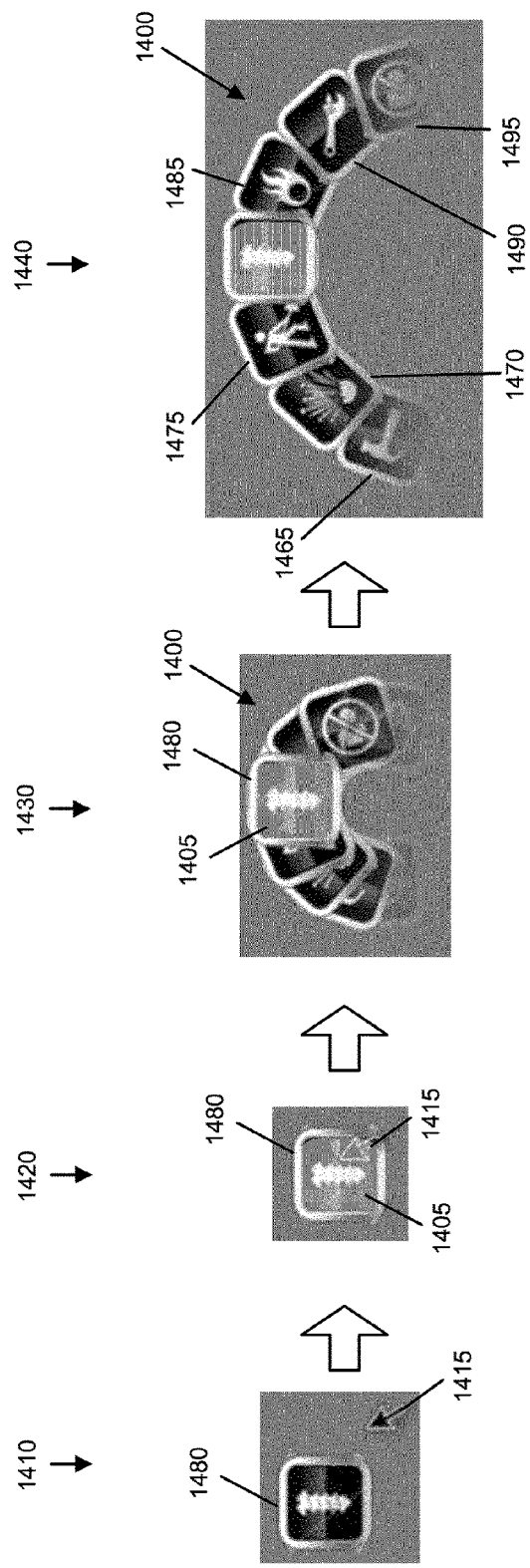
FIG. 14 illustrates the opening of a semi-circular menu of some embodiments.

FIG. 14 illustrates the opening of a semi-circular menu 1400 of some embodiments. FIG. 14 illustrates four stages, 1410, 1420, 1430, and 1440. Stages 1410 and 1420 illustrate menu 1400 prior to its opening, stage 1430 illustrates the menu partway through the opening process, and stage 1440 illustrates the menu once it is fully opened.

Stage 1410 illustrates a menu item 1480 on its own, with no selection window or associated menu items. Menu item 1480 is displayed as having a first color. Stage 1410 also illustrates a cursor 1415 that is near, but not over, the menu item. Stage 1420 illustrates the menu item 1480 now that cursor 1415 has been moved over it. Moving cursor 1415 over the menu item 1480 causes a display of a selection window 1405 over the menu item, such that the menu item now appears to be displayed as having a second color. Some embodiments actually display the menu item as having a different color, while others display a partially transparent selection window over the menu item. Some embodiments, as shown, display the selection window as soon as the cursor moves over the menu item. Other embodiments, however, wait to display the selection window until a user has actually pressed a mouse button or provided some other sort of selection input with the cursor over the menu item.

Stage 1430 illustrates menu 1400 shortly after a user has pressed a mouse button or provided some form of selection input (e.g., a keystroke, other mouse input, input from a different cursor controller, etc.). Menu item 1480 is still displayed within selection window 1405, and other menu items have started fanning out from item 1480. The display gives the appearance that the other menu items in menu 1400 were initially stacked underneath item 1480. The menu items that are not in the selection window (items other than 1480) are displayed as having the first color (i.e., the same color that item 1480 had in stage 1410).

Stage 1440 illustrates the menu 1400 after it has fully expanded out. Presently visible are menu items 1465 through 1495. Items 1465 and 1495 are displayed as partially faded, which provides a visual indication that the menu continues in both directions with more menu items.

FIG. 14 illustrates one possibility of how a menu can open, from stage 1420 to stage 1440. Some embodiments do not display the menu fanning out, and instead as soon as a user clicks the mouse button over the single menu item, the menu is displayed as shown at stage 1440. Some embodiments display the menu items as sliding along a semicircular track out to the locations shown at stage 1440, rather than expanding into the semi-circle as displayed in stage 1430. Other embodiments use other visual displays for opening the menu. Furthermore, these and other visual displays are used by some embodiments that use shapes other than semi-circles—the expanding menu is applicable to linear menus that display more than one menu item at once as well.

Figure 15:
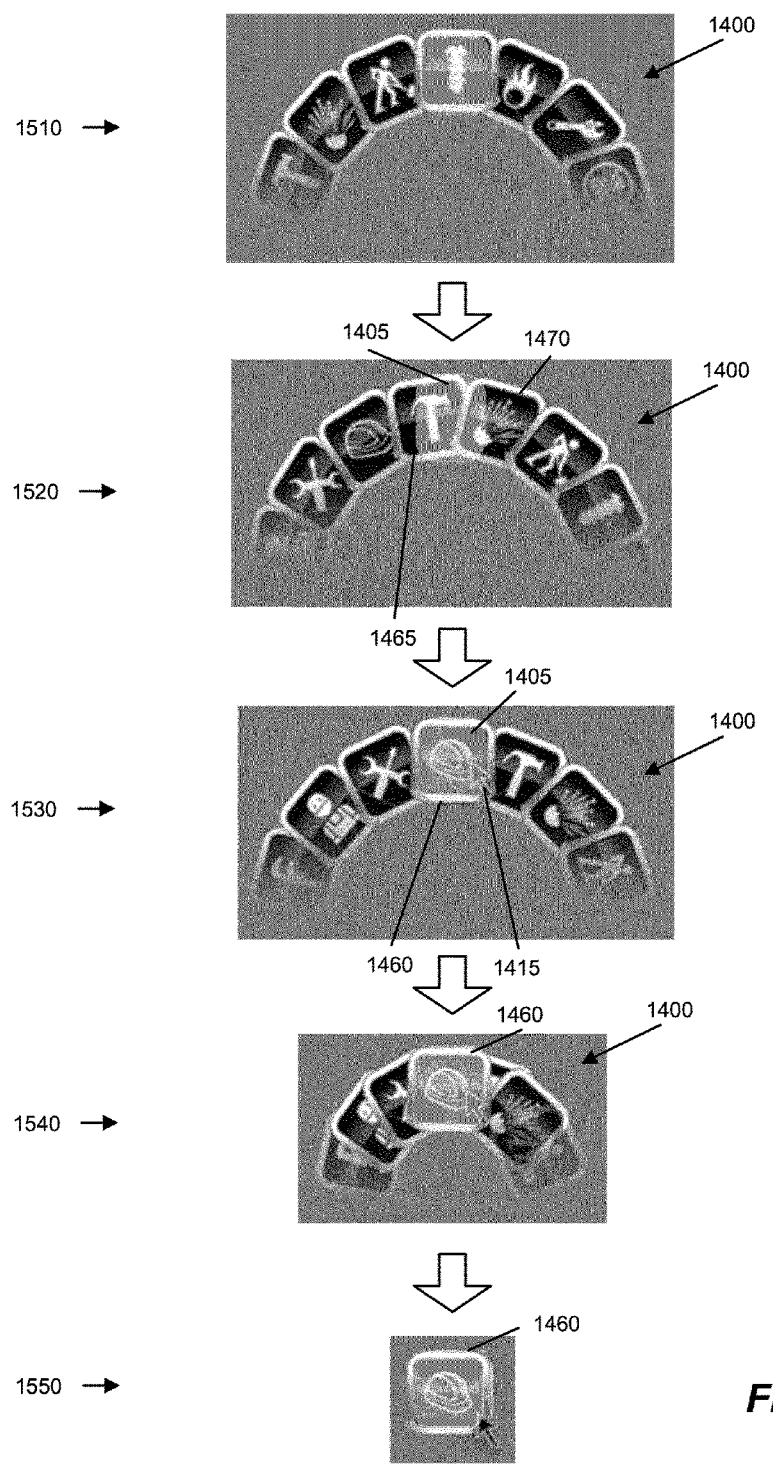
FIG. 15 illustrates the navigation of the menu of FIG. 14 and the selection of an item from the menu.

FIG. 15 illustrates the navigation of menu 1400 and selection of item 1460 from the menu. FIG. 15 illustrates five stages, 1510, 1520, 1530, 1540, and 1550. Stage 1510 illustrates menu 1400 at the same point as stage 1440 of FIG. 14, stage 1520 illustrates the navigation of menu 1400, and stages 1530-1550 illustrate the selection of item 1460.

Stage 1520 illustrates that a user has scrolled the menu such that the initial item in the selection window 1405 (item 1480) is now near the right edge of the displayed menu and is beginning to appear as partially faded. In some embodiments, in order to scroll the menu to this point, the user drags the mouse to the left while holding down the mouse button. As shown in stage 1520, the selection window 1405 is displayed as a partially transparent window that the menu items scroll underneath. Furthermore, as the selection window is currently in-between two menu items (1465 and 1470), the menu 1400 is one that scrolls according to a process similar to process 600, in which the items continuously scroll, and do not snap to the selection window. However, some embodiments do apply the other described scrolling processes, or similar processes, to semi-circular menus.

Stage 1530 illustrates that a user has scrolled the menu such that item 1460 is in selection window 1405 and released the mouse button in order to select item 1460. Cursor 1415 is now visible over selection window 1405 and item 1460. Stage 1540 illustrates the closing of menu 1400 around the selected item 1460. In some embodiments, the menu closes in the exact opposite pattern that it opened. Thus, when the menu items simply appeared around the initial item, then when the item is selected they disappear without any inward movement. When the menu items fan out as shown in FIG. 14, then the menu collapses inward as shown in stage 1540.

Stage 1550 illustrates that the menu has fully closed so that only item 1460 is displayed. In some embodiments, the selected menu item is now displayed, much like item 1480 was displayed at stage 1410 of FIG. 14. For instance, in some embodiments the menu is a toolbar. One example of such a toolbar is video-editing toolbar for a video-editing application. The video-editing toolbar of some embodiments includes video-editing tools such as a blade tool, ripple tool, slip tool, roll tool, etc. Selecting a tool makes that tool active, so that a user can then use the tool in the editing process. The selected tool is displayed until the user repeats the process to select a different tool. On the other hand, in some embodiments the menu is a list of commands, and closes when the user selects a particular command. Some such embodiments wait a short period of time, then revert the displayed menu item back to the initial item.

Figure 16:
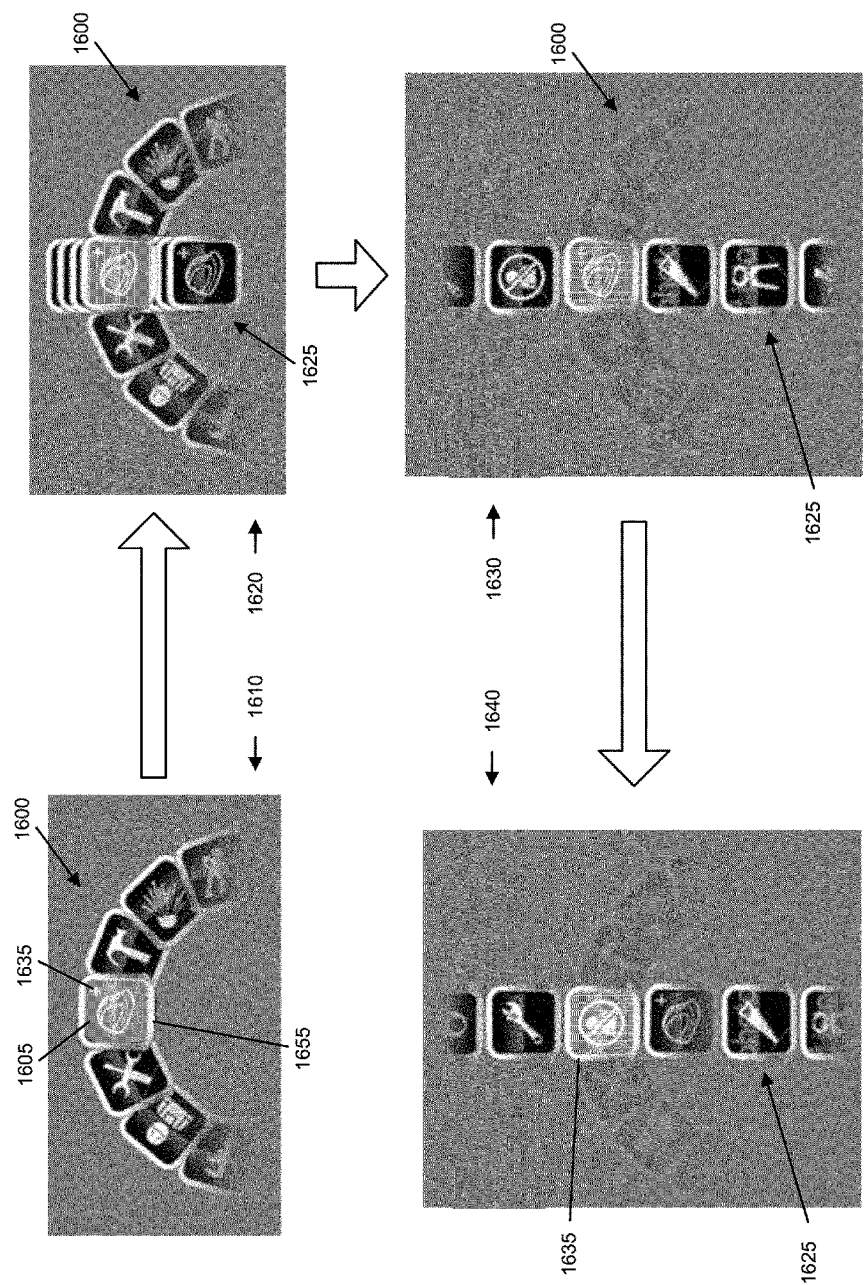
FIG. 16 illustrates an example of a semi-circular menu that includes a menu item that opens a sub-menu.

FIG. 16 illustrates an example of a semi-circular menu 1600, similar to those described above, that includes a menu item 1655 that opens a sub-menu 1625. FIG. 16 illustrates four stages, 1610, 1620, 1630, and 1640. Stage 1610 illustrates the menu after a user has navigated such that menu item 1655 is in selection window 1605, stage 1620 illustrates the opening of sub-menu 1625, and stages 1630 and 1640 illustrate the navigation of sub-menu 1625.

Stage 1610 illustrates a menu 1600 that is similar in nature to menu 1400. Currently in the selection window 1605 is menu item 1655. Item 1655 includes a small plus sign 1635 that indicates that its selection will cause a sub-menu to open. In some embodiments, such a symbol is used to graphically indicate that the selection of a menu item will cause a sub-menu to open. Other graphical indicators may be used by some embodiments, such as arrows, letters, etc. Other embodiments do not use graphical indicators, instead assuming that the user will know which menu items cause sub-menus to open. As shown in the following stages, some embodiments leave the graphical indicator with the particular item that causes the sub-menu to open as the user scrolls through the sub-menu. Other embodiments, however, leave the graphical indicator in the selection window as the user scrolls through the sub-menu, as in FIG. 12 above.

Stage 1620 illustrates menu 1600 shortly after a user has selected menu item 1655. Sub-menu 1625 has started to open vertically. In some embodiments, a sub-menu opens perpendicular to the tangent of the path followed by the parent menu. As the tangent to the semi-circular menu 1600 is horizontal at selection window 1605, sub-menu 1625 opens vertically.

As shown, the menu items of sub-menu 1625 spread apart from the selection window. As the items spread apart, the non-selected items of menu 1600 begin to fade. Stage 1630 illustrates the sub-menu 1625 after it has fully spread apart. At this point, the non-selected items of menu 1600 are mostly faded. Once the sub-menu has fully expanded, a user can navigate the sub-menu. For instance, much like the sub-menus described above, a user can move a mouse up or down in order to scroll the sub-menu items through the selection window. Stage 1640 illustrates sub-menu 1625 after a user has scrolled the menu down by one item such that menu item 1660 is in the selection window 1605.

In some embodiments, when a user selects an item from a sub-menu, both the primary menu (e.g., menu 1600) and the sub-menu (e.g., sub-menu 1625) collapse inwards at the same time. The menu collapses inwards in similar fashion to the manner illustrated in FIG. 15, whereas the sub-menu collapses in reverse of its expansion process. Different embodiments, though, will collapse the sub-menu first and then collapse the primary menu, or use different visual displays upon selection of an item from a sub-menu.

Much like the features described in Section I, many of the features described in this section are applicable to menus that are not semi-circular. For instance, menus of any shape can be expanded outwards from a single menu item upon selection of the single menu item. Similarly, such menus can collapse inwards upon selection of an item from the fully displayed menu.

III. Circular Menu Alternatives

The above sections described and included examples of menus for which not all of the menus are displayed at once, whether the menu is displayed linearly (as in Section I) or as a semi-circle (as in Section II). The following section presents examples of menus for which all of the menu items are displayed at once. Specifically, the menus described in this section are displayed in circular fashion.

Figure 17:
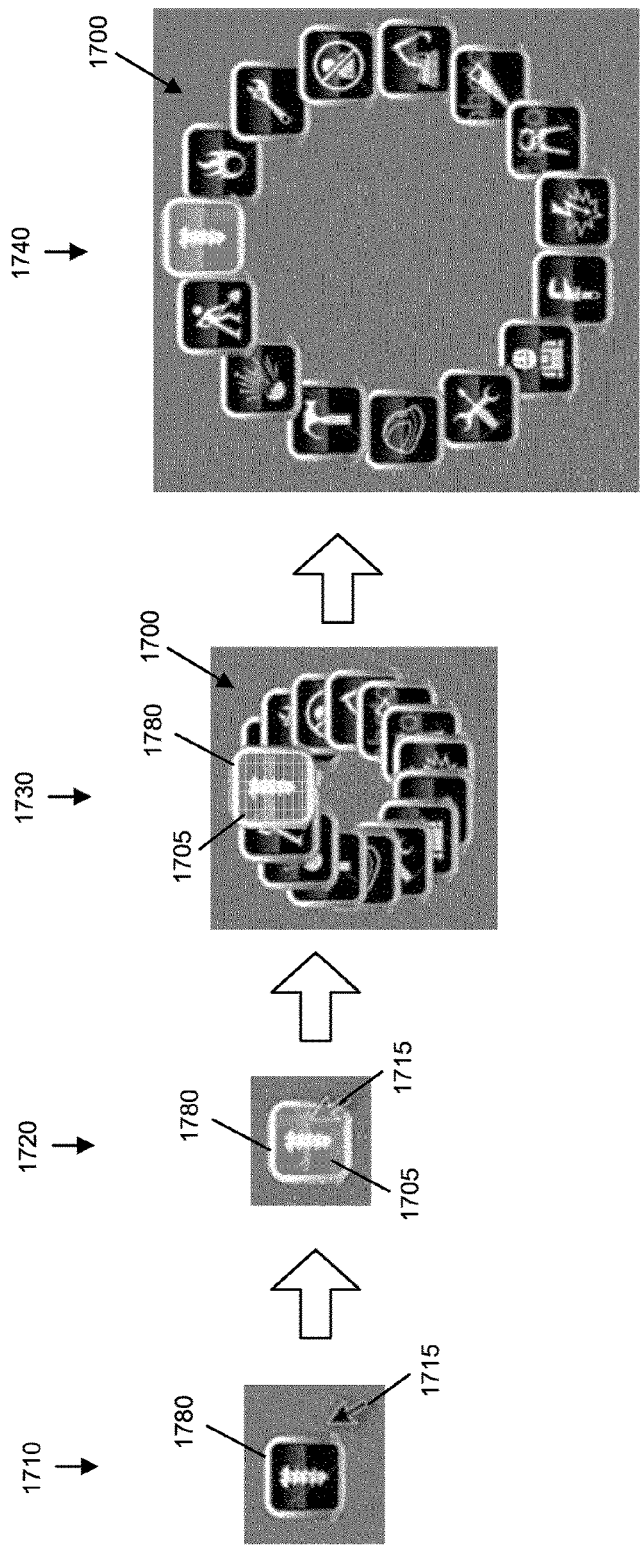
FIG. 17 illustrates the opening of a circular menu of some embodiments.

FIG. 17 illustrates the opening of a circular menu 1700 of some embodiments. FIG. 17 illustrates four stages, 1710, 1720, 1730, and 1740. Stages 1710 and 1720 illustrate menu 1700 prior to its opening, stage 1730 illustrates the menu partway through the opening process, and stage 1740 illustrates the menu once it is fully opened.

Stage 1710 illustrates a menu item 1780 on its own, with no selection window or associated menu items. Menu item 1780 is displayed as having a first color. Stage 1710 also illustrates a cursor 1715 that is near, but not over, the menu item. Stage 1720 illustrates the menu item 1780 now that cursor 1715 has been moved over it. Moving cursor 1715 over the menu item 1780 causes a display of a selection window 1705 over the menu item, such that the menu item now appears to be displayed as having a second color. Some embodiments actually display the menu item as having a different color, while others display a partially transparent selection window over the menu item. Some embodiments, as shown, display the selection window as soon as the cursor moves over the menu item. Other embodiments, however, wait to display the selection window until a user has actually pressed a mouse button or provided some other sort of selection input with the cursor over the menu item.

Up to this point, the behavior of menu 1700 is similar to that of menu 1400. However, stage 1730 illustrates that the menu 1700 is circular, rather than semi-circular like menu 1400. Stage 1730 illustrates menu 1700 shortly after a user has pressed a mouse button or provided some form of selection input (e.g., a keystroke, other mouse input, input from a different cursor controller, etc.) in order to open menu 1700. Menu item 1780 is still displayed within selection window 1705, and other menu items have started expanding outwards from item 1780. The display gives the appearance that the other menu items in menu 1700 were initially stacked underneath item 1780. The menu items that are not in the selection window (items other than 1780) are displayed as having the first color (i.e., the same color that item 1780 had in stage 1710).

Some embodiments, as shown, expand the menu downwards from the initial menu item (e.g., menu item 1780). Other embodiments, though, expand the menu outwards in all directions, such that the center of the circle is at the location in the graphical user interface where the initial menu item was before its selection. In some such embodiments, if the cursor is displayed while the user scrolls through the menu, the cursor is moved to the selection window at the top of the circle.

Stage 1740 illustrates the menu 1700 after it has fully expanded out. All of the menu items of menu 1700 are presently visible. In order to display the entirety of the menu items, some embodiments vary the radius of the circle depending on the number of menu items (i.e., the radius is larger when there are more menu items). Other embodiments vary the size of the menu items (i.e., the menu items are smaller when there are more of them so as to maintain the same radius). Yet other embodiments vary the amount of overlap between the menu items (i.e., the items overlap more when there are more items) in order to keep the menu items a constant size and the circle having a constant radius.

Navigation of the circular menus is similar to navigation of the semi-circular menus in some embodiments. By moving a mouse left or right while pressing down a mouse button, a user can cause the menu items to scroll through the selection window. One notable difference is that in the case of the circular menu, a user can scroll indefinitely in either direction. The menu does not have a first menu item or last menu item in its order. Instead, the menu items are only ordered relative to one another.

Circular menus such as menu 1700 can also include items the selection of which causes sub-menus to open in similar fashion to the sub-menu 1625 of FIG. 16. In some embodiments, the sub-menu opens vertically above and below the selection window, while the circular primary menu fades. However, as the primary menu does not fade completely, some embodiments only display the sub-menu below the selection window to the extent the menu items do not overlap with the bottom of the circular menu.

Figure 18:
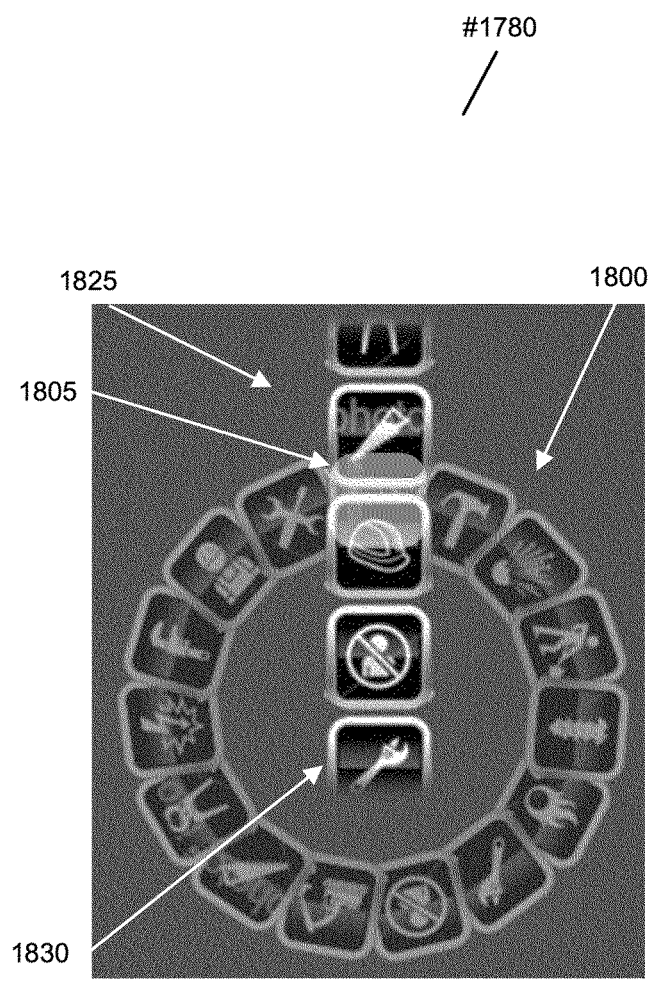
FIG. 18 illustrates a circular menu that is partially faded after a sub-menu has opened vertically above and below a selection window.

FIG. 18 illustrates a circular menu 1800 that is partially faded after a sub-menu 1825 has opened vertically above and below selection window 1805. Towards the bottom of sub-menu 1825, only part of menu item 1830 is displayed. Scrolling sub-menu 1825 up (e.g., by a user moving a cursor controller downwards) will result in the entirety of menu item 1830 being displayed as the next menu item below item 1830 begins to appear. Other embodiments, however, display the sub-menu extending over the bottom of the primary menu.

Some embodiments of the circular menus close in a manner similar to that of the semi-circular menus described above upon selection of a menu item. That is, the circular menu collapses in upon itself in reverse of how it opened. Thus, if the circular menu opened downwards from the initial menu item, the upon selection of an item from the menu, the menu closes with the displayed items collapsing back towards the selection window and selected item. On the other hand, if the circular menu opened outwards from the initial location of the initial menu item, then upon selection of an item from the menu, the menu closes with the displayed items collapsing inwards to that initial location. Similar to the description above for the semi-circular menus, other embodiments close circular menus differently.

IV. Uses of Menus

As discussed, the various menus described above can be used in a wide variety of computing applications. The menus can be used directly in an operating system or in an application separate from the operating system in some embodiments. Furthermore, the menus can be especially useful in handheld devices such as the iPhone®.

Figure 19:
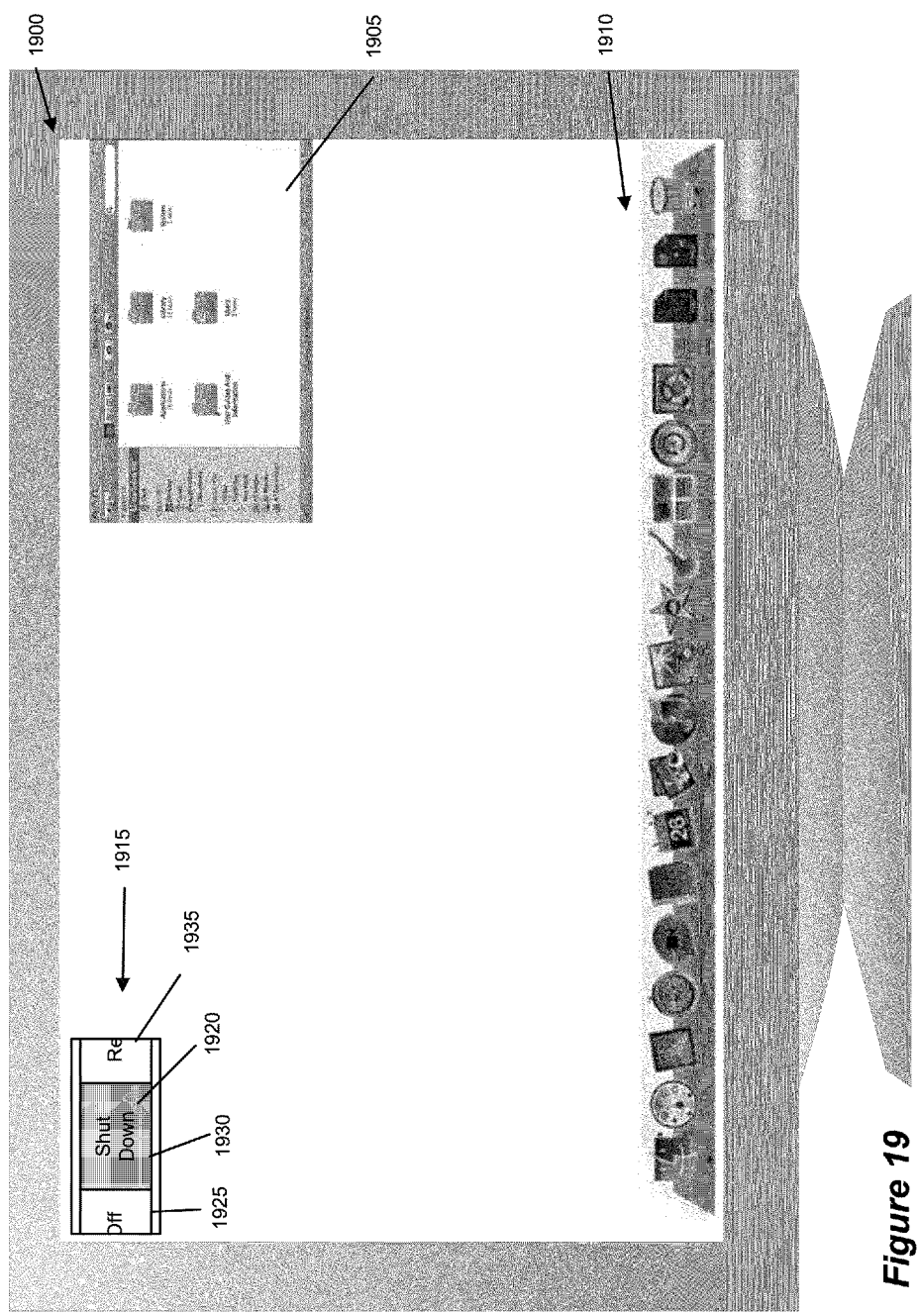
FIG. 19 illustrates a computer desktop displaying various features of an operating system of some embodiments.

FIG. 19 illustrates a computer desktop 1900 displaying various features of an operating system of some embodiments. The desktop includes a file folder navigation window 1905, application selection icons 1910, and menu 1915. The file folder navigation window 1905 is a standard window that enables a user to navigate a hierarchical file system in order to find and open a file (e.g., a word processing document, a spreadsheet, a video file, etc.). The application selection icons 1910 provide easy access for a user to the different applications (e.g., e-mail, web browsers, media players, word processing applications, media-editing applications, etc.) on the computing device.

Menu 1915 is one example of the use of the menus described above for providing operating system features. Menu 1915 presents various options related to shutting off the computer. Menu 1915 includes selection window 1920 and at least the three menu items 1925-1935 that are displayed or partially displayed. Item 1925 presents a "Log Off" option, item 1930 presents a "Shut Down" option, and item 1935 presents a "Restart" option. Some embodiments also include power-saving options such as "Standby".

In some embodiments, menu 1915 is permanently displayed as part of the desktop, though other items (e.g., windows such as window 1905) may be placed on top of menu 1915 such that the menu is not displayed. Other embodiments only display menu 1915 in response to user input such as a particular keystroke (or combination of keystrokes) or the selection of an option in the graphical user interface to bring up menu 1915.

One of ordinary skill in the art will recognize that the menus of some embodiments may be used for a wide variety of operating system features. As an example, the application selection icons could be integrated into a menu such as linear menu 1915 or one of the other menus described above. For instance, the application selection icons could be provided in a semi-circular menu such as menu 1400 that is displayed in one corner of the screen rather than taking up the entire bottom portion of the screen.

Figure 20:
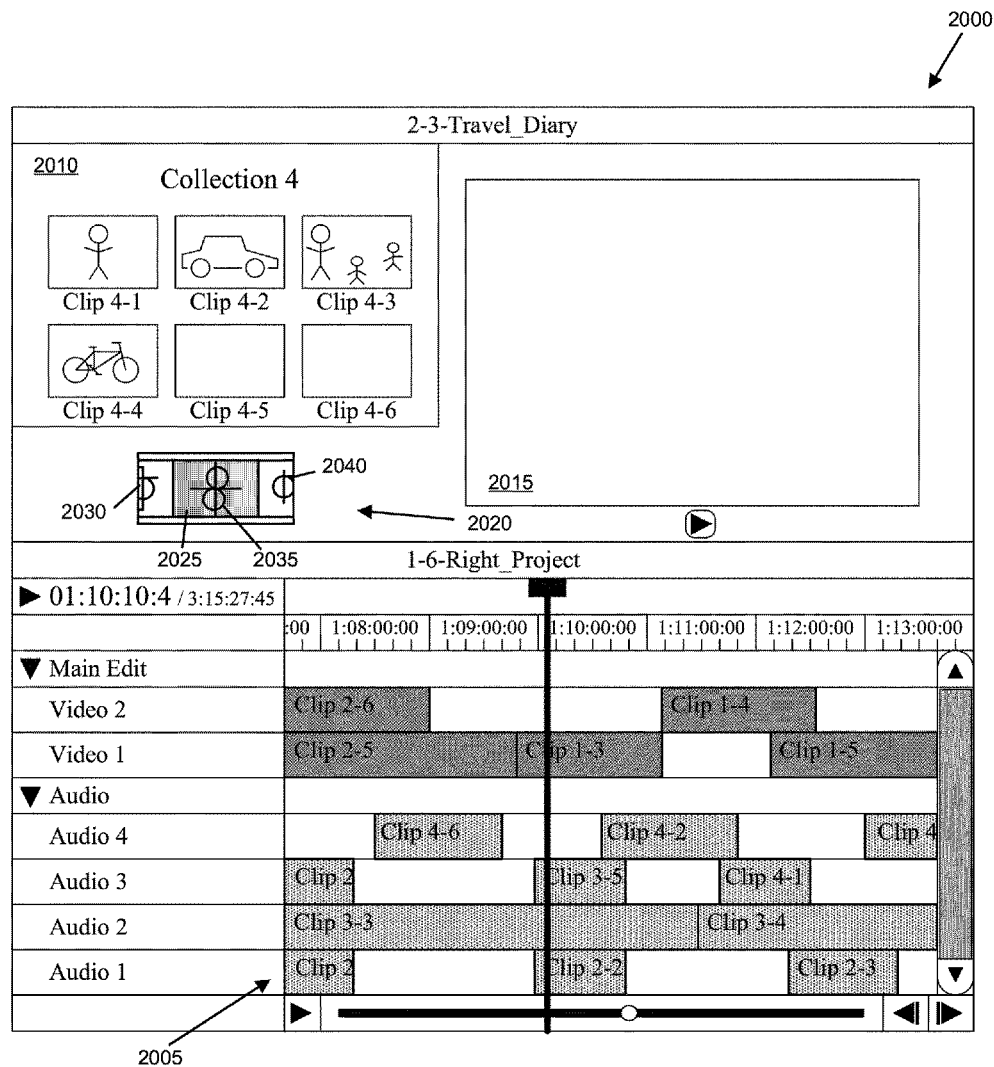
FIG. 20 illustrates a video-editing application that is used to create composite video presentations and that utilizes the menus of some embodiments.

FIG. 20 illustrates a video-editing application 2000 that is used to create composite video presentations and that utilizes the menus of some embodiments. Video-editing application 2000 includes a composite display area 2005, a set of selectable video clips 2010, video preview display area 2015, and a video-editing toolbar 2020.

The composite display area 2005 provides a visual representation of the video presentation that the user creates. Users can add media clips (e.g., audio and video clips) to the composite display area, where the clips are graphically represented. A user can modify the video presentation by performing editing operations on the clips in the composite display area. The set of selectable video clips 2010 provides various media clips, represented as thumbnails, that the user can select and add to the video presentation via the composite display area 2005. The video preview display area 2015 displays a preview of the composite presentation according to the composite display area.

The video-editing toolbar 2020 is an example of the use of the menus described above for providing video-editing tools. Specifically, toolbar 2020 provides the user with multiple trimming tool options. Currently shown in selection window 2025 is the roll tool 2035. Slide tool 2030 and slip tool 2040 are presently to the left and right of selection window 2025. Some embodiments include other trim tools in their toolbar, such as a ripple tool or blade tool.

Some embodiments present a variety of editing tools in a toolbar such as toolbar 2020. For instance, in addition to various trimming tools, some embodiments present other tools for editing the composite video presentation. On the other hand, some embodiments include multiple toolbars similar to toolbar 2020, such as one toolbar for the trim tools and a second toolbar for other video editing tools.

In some embodiments, toolbar 2020 is permanently displayed as part of the graphical user interface of the editing application. Other embodiments only display toolbar 2020 in response to user input such as a particular keystroke (or combination of keystrokes) or the selection of an option in the graphical user interface to bring up toolbar 2020. For instance, in some embodiments only one tool is displayed until a user invokes the menu (e.g., by clicking on the one displayed tool) at which point the toolbar showing more options is displayed. The examples of semi-circular menus illustrated in Section II are examples of such invocable toolbars or menus.

Figure 21:
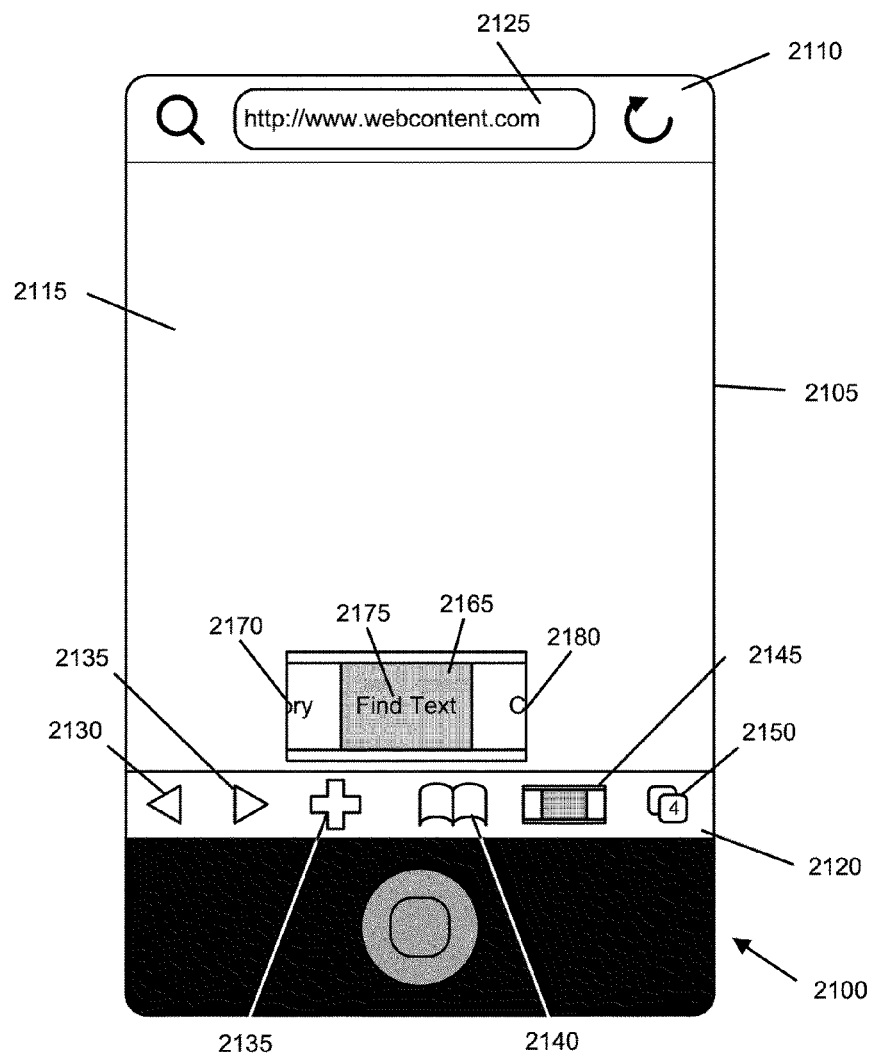
FIG. 21 illustrates a handheld device that is displaying a web browser that utilizes the menus of some embodiments.

FIG. 21 illustrates a handheld device 2100 that is presently displaying a web browser 2105. Device 2100 could be a cell phone, a media player, etc. Web browser 2105 includes includes a uniform resource locator (URL) toolbar 2110, a content display area 2115, and a toolbar 2120.

The URL bar 2110 includes user interface tools and an address bar 2125 in which a user can type a URL and which displays a URL of a website to which a user has navigated by clicking on links within content display area 2115. Content display area 2115 displays the web page located at the URL indicated in address bar 2125.

Toolbar 2120 includes six tools—back and forward buttons 2130 and 2135, an add bookmark icon 2140, a bookmarks icon 2145 for opening a list of bookmarks, a menu icon 2150 for opening a menu, and a page gallery icon 2155 for displaying a list of open web pages for the user to choose from. When a user selects the menu icon 2150, menu 2160 opens. In some embodiments, invoking the menu 2160 causes a first window (i.e., the menu window) to open within an already-displayed second window. This is the case for other applications of the menus of some embodiments as well, and is not restricted to handheld devices.

Menu 2160 presents various options that are not displayed in URL bar 2110 or toolbar 2120. Menu 2160 includes a find text option 2175 for bringing up a tool that allows a user to type in text to find in the content displayed in display area 2115. The find text option 2175 is presently in selection window 2165. Partially displayed on either side of the selection window 2165 is a history option 2170 and a copy option 2180.

In some embodiments, the device is a touchscreen device. A user can navigate the menu 2160 in some such embodiments by using finger sweep gestures to the right and left to move the items, and then tapping or double-tapping the selection window to select an item. Other embodiments may recognize different multi-touch gestures for navigating the menu 2160 and selecting an item from the menu.

One of ordinary skill will recognize that menus other than menu 2160 are possible for use in a handheld device browser. For instance, the toolbar 2120 could include a selection window and more items than are presently shown. A user could then scroll through the items until the desired item was in the selection window. Furthermore, such menus are not restricted in any way to browsers, and in fact could be used for any application on a handheld device. Screen space is often at a premium in handheld devices such as device 2100, so the menus described in this application are an ideal solution for providing numerous options in this limited space.

V. Software Architecture

Figure 22:
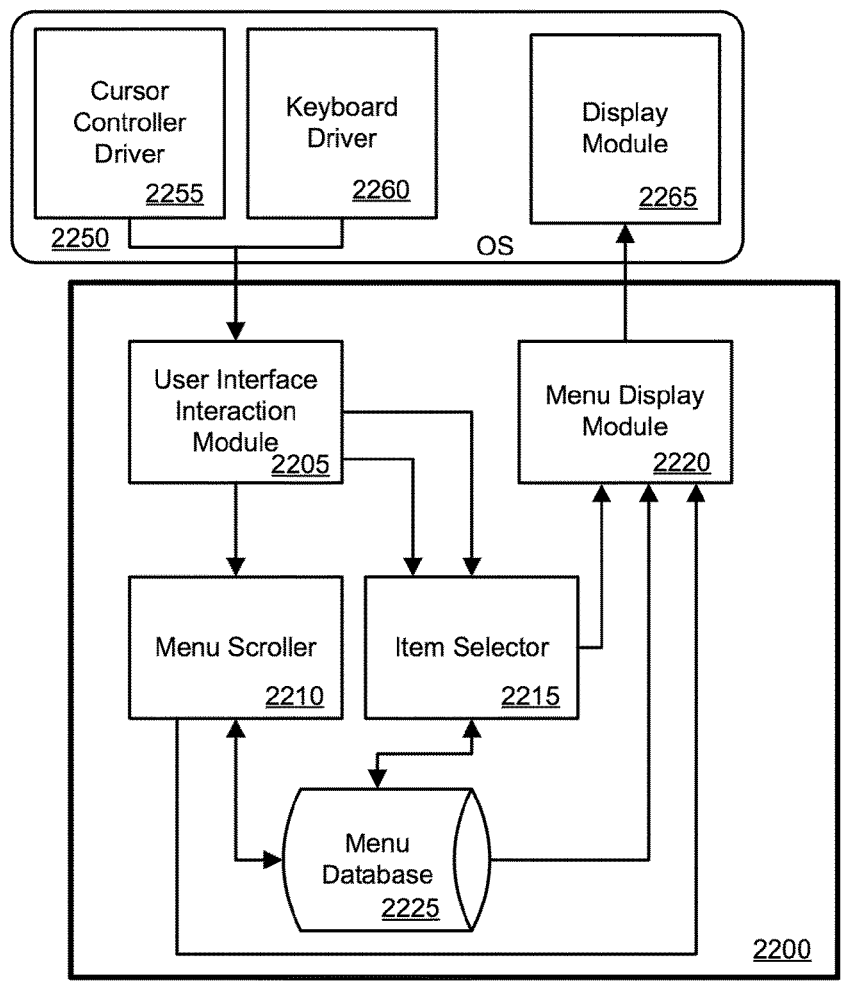
FIG. 22 conceptually illustrates the software architecture of an application of some embodiments for presenting menus.

In some embodiments, the processes described above are implemented as software running on a particular machine, such as a computer or a handheld device, or stored in a computer readable medium. FIG. 22 conceptually illustrates the software architecture of an application 2200 of some embodiments for presenting menus such as those described in the preceding sections. In some embodiments, the application is a stand-alone application or is integrated into another application (for instance, application 2200 might be a portion of a video-editing application), while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

Application 2200 includes a user interface (UI) interaction module 2205, a menu scroller 2210, an item selector 2215, and a menu display module 2220. The media-editing application also includes menu database 2225. In some embodiments, other storages are present as well, which may be part of the same physical storage as content storage 2225 or stored separately. FIG. 22 also illustrates an operating system 2250 that includes cursor controller driver 2255, keyboard driver 2260, and display module 2265. In some embodiments, as illustrated, the cursor controller driver 2255, keyboard driver 2260, and display module 2265 are part of the operating system 2250 even when the application 2200 is an application separate from the operating system.

A user interacts with the user interface via input devices (not shown). The input devices, such as cursor controllers (mouse, tablet, touchpad, etc.) and keyboards, send signals to the cursor controller driver 2255 and keyboard driver 2260, which translate those signals into user input data that is provided to the UI interaction module 2205. The UI interaction module interprets the user input data in the context of presented menus and passes it to the appropriate modules, such as the menu scroller 2210 and the item selector 2215.

Menu scroller 2210 interprets user interface interactions into the scrolling of menu items through a selection window. The menu scroller also receives information from the menu database 2225. This includes a list of the menu items and the order of the men items, inc some embodiments. In different embodiments the menu scroller 2210 scrolls the menu in response to different inputs. For instance, in some embodiments the menu scroller 2210 scrolls menu items based on one of the inputs described by processes 400, 600, 800, or 1000 above. The menu scroller sends the menu scrolling information to the menu display module 2220.

The item selector 2215 interprets user interface interactions into the selection of menu items. The item selector also receives information, such as the list of menu items and their order, from the menu database in some embodiments. The item selector 2215 recognizes which item is in the selection window when selection input is received. In some embodiments, the item selector 2215 also recognizes when a single item is selected in order to open a menu, as described in Sections II and III above. The selection information is passed to the menu display module. In some embodiments, the item selector also passes this information to other modules (not shown) that perform a command or activate a tool that is associated with the selected menu item.

The menu display module 2220 receives information from the menu scroller 2210 and the item selector 2215. The menu display module 2220 controls the display of the movement of the menu items. In some embodiments, the menu display module handles the opening and closing of the menus in response to item selection, including any submenus. This information is sent to display module 2265, which handles the actual display of the menus (and the rest of the graphical user interface) on an output device (not shown).

While many of the features have been described as being performed by one module (e.g., the navigation module 2215 or frame compressor 2235), one of ordinary skill would recognize that the functions might be split up into multiple modules, and the performance of one feature might even require multiple modules.

Figure 23:
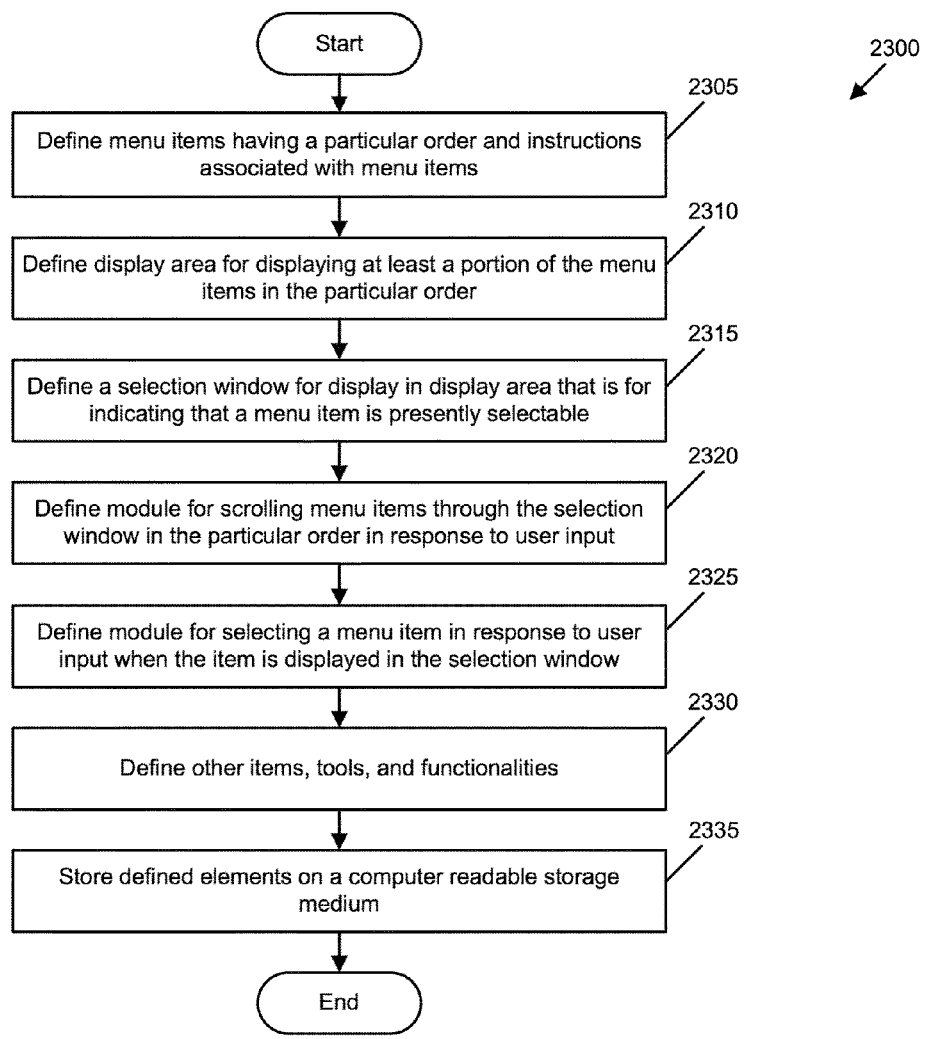
FIG. 23 conceptually illustrates a process of some embodiments for manufacturing a computer readable medium that stores a computer program.

FIG. 23 conceptually illustrates a process 2300 of some embodiments for manufacturing a computer readable medium that stores a computer program. In some embodiments, the computer readable medium is a distributable CD-ROM. As shown, process 2300 begins by defining (at 2305) menu items having a particular order and instructions associated with the menu items. The menu items 101-108 of menu 100 of FIG. 1 are an example of such menu items.

Process 2300 then defines (at 2310) a display area for displaying at least a portion of the menu items in the particular order. The process also defines (at 2315) a selection window for display in the display area that is for indicating that a menu item is presently selectable, such as selection windows 205, 505, or 1405 of FIGS. 2, 5, and 14, respectively.

Next, process 2300 defines (at 2320) a module for scrolling menu items through the selection window in the particular order in response to user input. Menu scroller 2210 of FIG. 22 is one example of such a module. The process also defines (at 2325) a module for selecting a menu item in response to user input when the menu item is displayed in the selection window, such as menu selector 2215.

Next, the process defines (at 2330) other tools, items, and functionalities. For example, if the process is for manufacturing a media-editing application such as that shown in FIG. 20, various GUI items and editing tools and functionalities are defined.

Process 2300 then stores (at 2325) the defined elements on a computer readable storage medium. As mentioned above, in some embodiments the computer readable storage medium is a distributable CD-ROM. In some embodiments, the medium is one or more of a solid-state device, a hard disk, a CD-ROM, or other non-volatile computer readable storage medium. One of ordinary skill in the art will recognize that the various modules and UI items defined by process 2300 are not exhaustive of the modules and UI items that could be defined and stored on a computer readable storage medium for an editing application incorporating some embodiments of the invention.

VI. Computer System

Many of the above-described features and applications are implemented as software processes that are specified as a set of instructions recorded on a computer readable storage medium (also referred to as computer readable medium). When these instructions are executed by one or more computational element(s) (such as processors or other computational elements like ASICs and FPGAs), they cause the computational element(s) to perform the actions indicated in the instructions. Computer is meant in its broadest sense, and can include any electronic device with a processor. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs when installed to operate on one or more computer systems define one or more specific machine implementations that execute and perform the operations of the software programs.

Figure 24:
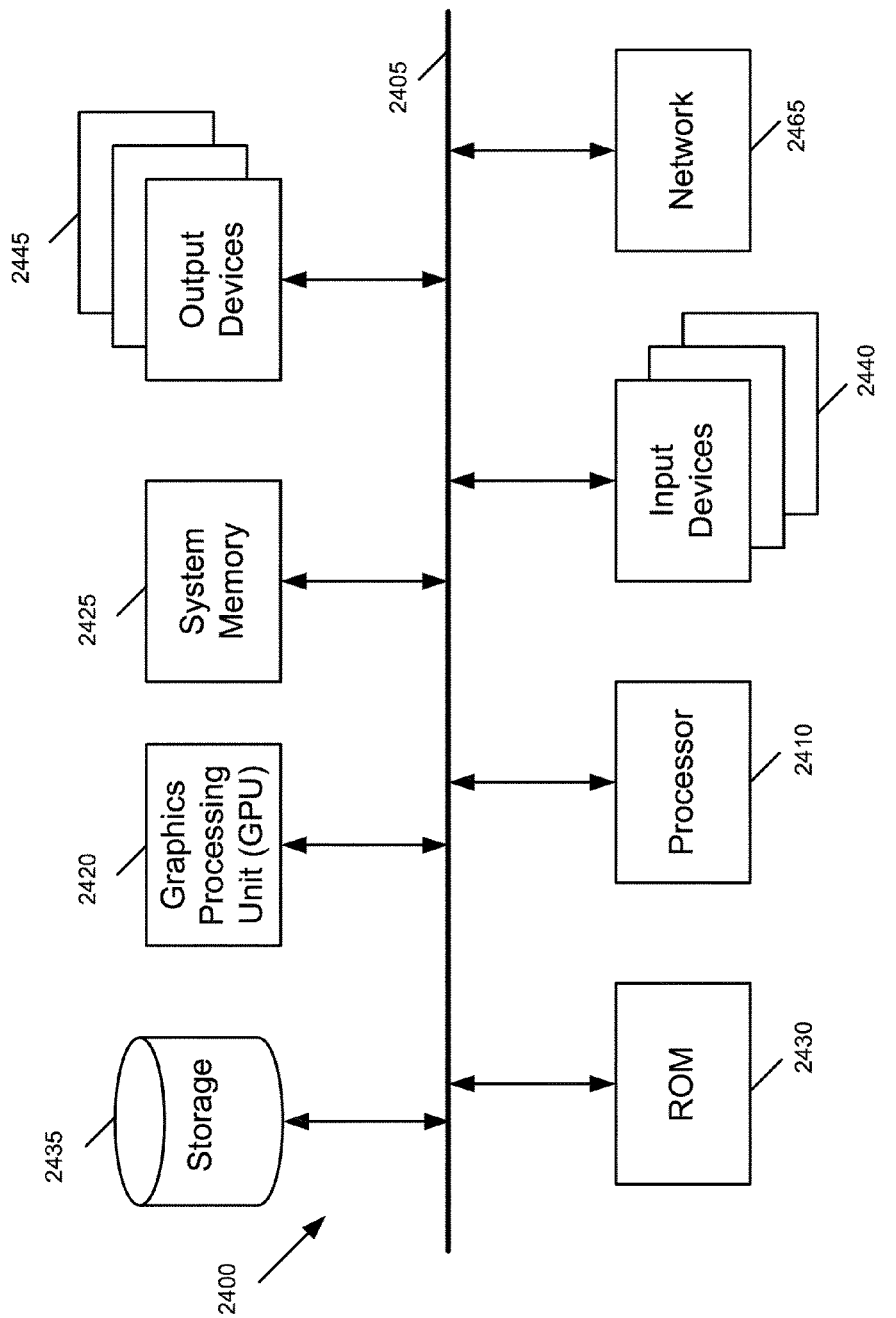
FIG. 24 conceptually illustrates a computer system with which some embodiments of the invention are implemented.

FIG. 24 illustrates a computer system with which some embodiments of the invention are implemented. Such a computer system includes various types of computer readable media and interfaces for various other types of computer readable media. Computer system 2400 includes a bus 2405, a processor 2410, a graphics processing unit (GPU) 2420, a system memory 2425, a read-only memory 2430, a permanent storage device 2435, input devices 2440, and output devices 2445.

The bus 2405 collectively represents all system, peripheral, and chipset buses that communicatively connect the numerous internal devices of the computer system 2400. For instance, the bus 2405 communicatively connects the processor 2410 with the read-only memory 2430, the GPU 2420, the system memory 2425, and the permanent storage device 2435.

From these various memory units, the processor 2410 retrieves instructions to execute and data to process in order to execute the processes of the invention. In some embodiments, the processor comprises a Field Programmable Gate Array (FPGA), an ASIC, or various other electronic components for executing instructions. In some embodiments, the processor Some instructions are passed to and executed by the GPU 2420. The GPU 2420 can offload various computations or complement the image processing provided by the processor 2410. In some embodiments, such functionality can be provided using CoreImage's kernel shading language.

The read-only-memory (ROM) 2430 stores static data and instructions that are needed by the processor 2410 and other modules of the computer system. The permanent storage device 2435, on the other hand, is a read-and-write memory device. This device is a non-volatile memory unit that stores instructions and data even when the computer system 2400 is off. Some embodiments of the invention use a mass-storage device (such as a magnetic or optical disk and its corresponding disk drive) as the permanent storage device 2435.

Other embodiments use a removable storage device (such as a floppy disk, flash drive, or ZIP® disk, and its corresponding disk drive) as the permanent storage device. Like the permanent storage device 2435, the system memory 2425 is a read-and-write memory device. However, unlike storage device 2435, the system memory is a volatile read-and-write memory, such a random access memory. The system memory stores some of the instructions and data that the processor needs at runtime. In some embodiments, the invention's processes are stored in the system memory 2425, the permanent storage device 2435, and/or the read-only memory 2430. For example, the various memory units include instructions for processing multimedia items in accordance with some embodiments. From these various memory units, the processor 2410 retrieves instructions to execute and data to process in order to execute the processes of some embodiments.

The bus 2405 also connects to the input and output devices 2440 and 2445. The input devices enable the user to communicate information and select commands to the computer system. The input devices 2440 include alphanumeric keyboards and pointing devices (also called "cursor control devices"). The output devices 2445 display images generated by the computer system. For instance, these devices display a GUI. The output devices include printers and display devices, such as cathode ray tubes (CRT) or liquid crystal displays (LCD).

Finally, as shown in FIG. 24, bus 2405 also couples computer 2400 to a network 2465 through a network adapter (not shown). In this manner, the computer can be a part of a network of computers (such as a local area network ("LAN"), a wide area network ("WAN"), or an Intranet, or a network of networks, such as the internet. For example, the computer 2400 may be coupled to a web server (network 2465) so that a web browser executing on the computer 2400 can interact with the web server as a user interacts with a GUI that operates in the web browser.

Any or all components of computer system 2400 may be used in conjunction with the invention. For instance, in some embodiments the execution of the frames of the rendering is performed by the GPU 2420 instead of the CPU 2410. Similarly, other image editing functions can be offloaded to the GPU 2420 where they are executed before the results are passed back into memory or the processor 2410. However, a common limitation of the GPU 2420 is the number of instructions that the GPU 2420 is able to store and process at any given time. Therefore, some embodiments adapt instructions for implementing processes so that these processes fit onto the instruction buffer of the GPU 2420 for execution locally on the GPU 2420. Additionally, some GPUs 2420 do not contain sufficient processing resources to execute the processes of some embodiments and therefore the CPU 2410 executes the instructions. One of ordinary skill in the art would appreciate that any other system configuration may also be used in conjunction with the present invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD–RW, DVD+RW, etc.), flash memory (e.g., SD cards, mini-SD cards, micro-SD cards, etc.), magnetic and/or solid state hard drives, read-only and recordable blu-ray discs, ultra density optical discs, any other optical or magnetic media, and floppy disks. The computer-readable media may store a computer program that is executable by at least one processor and includes sets of instructions for performing various operations. Examples of hardware devices configured to store and execute sets of instructions include, but are not limited to, application specific integrated circuits (ASICs), field programmable gate arrays (FPGA), programmable logic devices (PLDs), ROM, and RAM devices. Examples of computer programs or computer code include machine code, such as is produced by a compiler, and files including higher-level code that are executed by a computer, an electronic component, or a microprocessor using an interpreter.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method comprising:
    displaying, using one or more processors, a plurality of menu items within a display area on a display screen of a device, wherein the plurality of menu items is comprised of a first plurality of menu items having a first order and a second plurality of menu items having a second order;
    displaying, using one or more processors, a selection indicator for indicating that a menu item is selectable, wherein menu items in the first plurality of menu items are scrollable through the selection indicator in a first direction, and further wherein menu items in the second plurality of menu items are scrollable through the selection indicator in a second direction that intersects the first direction;
    displaying, using one or more processors, the first plurality of menu items in the first order;
    detecting a selection of one of the menu items in the first plurality of menu items, and in response to the selection, displaying the second plurality of menu items in the second order and displaying in a faded manner the first plurality of menu items in the first order.

2. The method of claim 1, wherein the first plurality of menu items are displayed in a linear layout.

3. The method of claim 1, wherein the first plurality of menu items are displayed in a semi-circular layout.

4. The method of claim 3, wherein the selection indicator is provided at a top of the semi-circular layout.

5. The method of claim 1, wherein the first plurality of menu items are scrollable through a side of the selection indicator and out of an opposite side of the side of the selection indicator.

6. The method of claim 1, wherein the menu items are displayed as partially faded when the menu items are near sides of the display area.

7. The method of claim 1, wherein a cursor controller input is received as the selection of one of the menu items in the first plurality of menu items.

8. The method of claim 1, wherein the menu items are for accessing video-editing tools, wherein the display area is defined as part of a video-editing application.

9. The method of claim 8, wherein the video-editing tools comprise at least one of a ripple tool, a roll tool, a slide tool, and a slip tool.

10. The method of claim 1, wherein the first plurality of menu items are scrollable through the selection indicator in the first direction according to the first order without moving the selection indicator and the second plurality of menu items are scrollable through the selection indicator in the second direction according to the second order without moving the selection indicator.

11. A non-transitory computer readable storage medium storing a computer program for execution by at least one processor, the computer program comprising a graphical user interface (GUI), the GUI comprising:
    a display area for displaying a menu with a plurality of menu items arranged in a particular order; and
    a selection indicator in the display area for indicating that a menu item is selectable; and
    an interaction module for (i) receiving a first user input at a first side of the selection indicator to scroll menu items with respect to the selection indicator in the particular order and (ii) receiving a second user input to select a particular menu item when the particular menu item is indicated by the selection indicator,
    wherein when the interaction module receives an amount of input that passes a threshold amount of movement, the interaction module has the selection indicator indicate a new menu item as the selectable menu item,
    wherein when the interaction module receives an amount of input that does not pass the threshold amount, the interaction module maintains the selection indicator's indication of a previous menu item as the selectable menu item.

12. The non-transitory computer readable storage medium of claim 11, wherein the computer program provides the GUI in a media-editing application.

13. The non-transitory computer readable storage medium of claim 11, wherein the computer program provides the GUI in an operating system of a computer.

14. The non-transitory computer readable storage medium of claim 11, wherein the computer program provides the GUI for a touchscreen in a hand-held device.

15. The non-transitory computer readable storage medium of claim 11, wherein the selection indicator indicates that the menu item is selectable by highlighting the menu item.

16. The non-transitory computer readable storage medium of claim 11, wherein the user input to scroll is directional input.

17. The non-transitory computer readable storage medium of claim 16, wherein the threshold amount of movement is based on a speed of the directional input.

18. The non-transitory computer readable storage medium of claim 11, wherein the display area is further for displaying, in response to the user input to scroll, an animation of a first menu item moving through the selection indicator to an extent of the amount of the user input.

19. The non-transitory computer readable storage medium of claim 11, wherein the user input to scroll the menu items with respect to the selection indicator in the particular order causes the display area to display the menu items scrolling through the selection indicator without moving the selection indicator.

20. The non-transitory computer readable storage medium of claim 11, wherein the user input to scroll the menu items with respect to the selection indicator in the particular order causes the display area to display the menu items scrolling through the selection indicator by moving the selection indicator.

21. The non-transitory computer readable storage medium of claim 11, wherein the user input to scroll the menu items with respect to the selection indicator in the particular order causes the display area to display the menu items scrolling through the selection indicator without moving the menu items.

22. The non-transitory computer readable storage medium of claim 11, wherein the received first user input comprises a swipe gesture input.

23. The non-transitory computer readable storage medium of claim 11, wherein the received first user input comprises a drag input.

24. A non-transitory computer readable storage medium storing a computer program for execution by at least one processing unit, the computer program comprising sets of instructions for:
   displaying a display area for displaying a first plurality of menu items in a first order, and for displaying a second plurality of menu items in a second order when one menu item in the first plurality of menu items is selected; and
   displaying a selection indicator in the display area for indicating that a menu item is selectable,
   wherein the first plurality of menu items are scrollable through the selection indicator in a first direction according to the first order, wherein the second plurality of menu items are scrollable through the selection indicator according to the second order in a second direction that intersects the first direction.

25. The non-transitory computer readable storage medium of claim 24, wherein the first direction is orthogonal to the second direction.

26. The non-transitory computer readable storage medium of claim 24, wherein the display area is for displaying the first plurality of menu items in a circular layout.

27. The non-transitory computer readable storage medium of claim 26, wherein the display area is for displaying the second plurality of menu items in a linear layout.

28. The non-transitory computer readable storage medium of claim 24, wherein the display area is for displaying the first plurality of menu items in a semi-circular layout.

29. The non-transitory computer readable storage medium of claim 28, wherein the display area is for displaying the second plurality of menu items in a linear layout.

* * * * *

UNITED STATES PATENT AND TRADEMARK OFFICE
CERTIFICATE OF CORRECTION

| | | |
|---|---|---|
| PATENT NO. | : 8,601,389 B2 | Page 1 of 1 |
| APPLICATION NO. | : 12/433891 | |
| DATED | : December 3, 2013 | |
| INVENTOR(S) | : Schulz et al. | |

It is certified that error appears in the above-identified patent and that said Letters Patent is hereby corrected as shown below:

In The Claims

In column 30, line 5, in claim 1, after "order;", insert --and--, therefor

Signed and Sealed this
Eleventh Day of November, 2014

Michelle K. Lee
*Deputy Director of the United States Patent and Trademark Office*